United States Patent
Goetz

(10) Patent No.: US 10,442,309 B2
(45) Date of Patent: Oct. 15, 2019

(54) APPARATUS AND METHOD FOR AN ELECTRIC POWER SUPPLY WITH CHANGEABLE ELECTRIC CONNECTIVITY BETWEEN BATTERY MODULES

(71) Applicant: Dr. Ing. h.c. F. Porsche Aktiengesellschaft, Stuttgart (DE)

(72) Inventor: Stefan Goetz, Durham, NC (US)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 132 days.

(21) Appl. No.: 15/551,820

(22) PCT Filed: Apr. 27, 2016

(86) PCT No.: PCT/EP2016/059453
§ 371 (c)(1),
(2) Date: Aug. 17, 2017

(87) PCT Pub. No.: WO2016/174117
PCT Pub. Date: Nov. 3, 2016

(65) Prior Publication Data
US 2018/0043789 A1    Feb. 15, 2018

(30) Foreign Application Priority Data

Apr. 30, 2015 (GB) .................................. 1507518.7

(51) Int. Cl.
*H01M 10/44* (2006.01)
*H01M 10/46* (2006.01)
(Continued)

(52) U.S. Cl.
CPC ............ *B60L 11/1879* (2013.01); *B60L 50/64* (2019.02); *B60L 50/66* (2019.02); *B60L 58/22* (2019.02);
(Continued)

(58) Field of Classification Search
CPC ...... H02J 7/0014; H02J 7/0008; H02J 7/0034; H02J 7/007; H02J 7/008; H02J 7/0091
(Continued)

(56) References Cited

U.S. PATENT DOCUMENTS 8,536,729 B2    9/2013    Rozman et al.
9,634,601 B2    4/2017    Kessler et al.
(Continued)

FOREIGN PATENT DOCUMENTS

CA        2806817 A1      2/2012
DE    102011069648 A1     6/2013
(Continued)

OTHER PUBLICATIONS

Mehrdad Ehsan, et al., "Hybrid Electric Vehicles: Architecture and Motor Drives," Proceedings of the IEEE, vol. 95. No. 4, Apr. 2007, 10 pages.
(Continued)

*Primary Examiner* — Edward Tso
(74) *Attorney, Agent, or Firm* — RatnerPrestia

(57) ABSTRACT

A traction power source for electric vehicles in a single unit. Specifically, traction power source integrates several functions, such as the battery and inverter. In addition, further functionalities that are traditionally in separate units can be integrated into the system and efficiently performed by the same electronics, such as battery management and thermal management.

48 Claims, 20 Drawing Sheets

(51) Int. Cl.
  *B60L 11/18* (2006.01)
  *H02J 7/00* (2006.01)
  *H02M 7/49* (2007.01)
  *H02J 7/14* (2006.01)
  *B60L 58/22* (2019.01)
  *B60L 50/60* (2019.01)
  *B60L 50/64* (2019.01)

(52) U.S. Cl.
  CPC .......... *H02J 7/0021* (2013.01); *H02J 7/0024* (2013.01); *H02J 7/0026* (2013.01); *H02J 7/1423* (2013.01); *H02M 7/49* (2013.01); *H02J 7/0014* (2013.01); *Y02T 10/7005* (2013.01); *Y02T 10/7055* (2013.01); *Y02T 10/7061* (2013.01); *Y02T 10/92* (2013.01)

(58) Field of Classification Search
  USPC ....... 320/107, 116, 132, 134, 135, 141, 149, 320/118, 119
  See application file for complete search history.

(56) References Cited

U.S. PATENT DOCUMENTS 9,718,364 B2  8/2017  Fetzer et al.
2003/0214826 A1  11/2003  Zhu et al.
2011/0181245 A1  7/2011  Wey et al.
2013/0317686 A1  11/2013  Schleser et al.
2014/0312619 A1  10/2014  Plant et al.
2015/0270801 A1*  9/2015  Kessler ................. H02J 7/0024
                                                        318/139

FOREIGN PATENT DOCUMENTS

DE     102012007158 A1  10/2013
DE     102012210010 A1  12/2013
DE     102013205562 A1  10/2014
WO        2014016126 A1   1/2014
WO        2014145756 A1   9/2014

OTHER PUBLICATIONS

International Search Report and Written Opinion for International Application No. PCT/EP2018/059453, dated Sep. 22, 2016—11 Pages.

* cited by examiner

APPARATUS AND METHOD FOR AN ELECTRIC POWER SUPPLY WITH CHANGEABLE ELECTRIC CONNECTIVITY BETWEEN BATTERY MODULES

CROSS-REFERENCE TO RELATED APPLICATIONS

This U.S. national phase patent application claims priority to PCT International Patent Application No. PCT/EP2016/059453, filed Apr. 27, 2016, which claims priority to British Patent Application No. GB 1507518.7, filed Apr. 30, 2015, the content of each application being incorporated by reference herein in its entirety.

FIELD OF THE INVENTION

The present invention relates to a battery-sourced electric power supply, particularly for use in electric drives, e.g., on ships, vehicles, airplanes, and the like.

BACKGROUND AND SUMMARY OF THE INVENTION

The invention describes a novel technology that can integrate so far separated power units of a drive system, e.g., of vehicles, ships, and aircraft. The traditional separate units that can be omitted or simplified in consequence include: one or several DC/DC converters that adjust the battery voltage to one or several electric machines; one or several drive inverters that invert the DC voltage output of the one or more DC/DC converters or of at least one battery for one or several AC or multiphase electric machines; one or several chargers, which may include a converter, one or several step-down-converters to include low-voltage, such as a 12 V/24 V/48 V auxiliary power supply bus in cars; a battery management system that monitors, controls, and/or balances for instance, the state of charge, the temperature, the power of current load, and/or the ageing of sub-portions of the battery or of individual cells.

Electric trains, electric ships, and electric cars according to the state of the art, including hybrid electric, fuel-cell electric, diesel electric, and battery-electric versions, typically comprise at least one energy source and/or electrical storage element that provide the energy for at least one electric machine. Whereas earlier electric cars preferably used DC motors as electric machine, more recent vehicles implement multiphase AC motors, e.g., synchronous machines and induction machines, and can typically not be operated directly with the electricity provided by the available one or more energy source elements and/or one or more electrical storage elements. For instance, most electric storage elements use DC voltages, which is not compatible to the AC power the machine requires. Furthermore, the properties of the AC power for the machine, such as amplitude, frequency, and phase relationship with the rotor position determine the working point of the machine. The at least one separate power electronic converter of conventional drive trains converts the electrical power between the units, such as one or more electrical storage elements, one or more electric sources, or one or more electrical machines, and adjusts the properties of the electrical power. Power electronic converters convert, for instance, DC voltage into single-phase or into single-phase or multiphase AC voltage; DC voltage of one voltage into DC voltage with another voltage; or AC voltage to DC voltage. Often such power electronic converters can furthermore be current-controlled.

If not further specified, the term converter will denote inverters, rectifiers, and converters in the following.

The prior art strictly separates electric sources as well as electric storage elements and power electronic converters as shown in the literature [M. Ehsani, Y. Gao, J. M. Miller (2007). Hybrid electric vehicles: architecture and motor drives. Proceedings of the IEEE, 95(4):719-728.]. This separation is usually also highlighted by separate casings for each separate unit. Prior art demonstrates that the separation of power sources, such as batteries, and power electronic units, such as inverters, in drive units is highly established and not subject to any doubt by persons skilled in the art as is supported by Rozman et al. in U.S. Pat. No. 8,536,729, Schleser et al. in US 2013/0317686, and Plant et al. in US 2014/0312619.

In many conventional electric drives that incorporate batteries, e.g., battery electric or hybrid cars, the involved batteries have usually a lower voltage than the installed electric machines would require for their peak power. In electric cars, for instance, battery-pack voltages of about 200 V to 400 V and peak machine voltages of about 600 V to 1000 V are frequently used, e.g., shown by Hatanaka in CA 2806817, Liu et al. in DE 10 2012 007 158, and Zhu et al. US 2003/0214826. The reasons for using a lower battery-pack voltage than peak machine voltage include safety and stability over a wide state-of-charge (SOC) range. As the battery pack in conventional applications is hard-wired and therefore presents the peak voltage at all times, also while the machine is not operated and/or the so system turned off, it is assumed to be a major safety risk and complicates the work of rescue teams in case of accidents. With respect to the SOC, manufacturers for example of electric vehicles expect the rated peak mechanical power and speed at the one or several machines even for low SOC, e.g. 20% to 40% SOC. Thus, a DC/DC converter can further compensate the reduced voltage of the battery to achieve the requirements of the machine.

The present invention allows eliminating such DC/DC stages. As a solution, the same number of battery cells as in conventional battery packs can be distributed among modules such that the sum of the module voltages for every phase is higher than the required phase voltage for maximum power in the machine, also when the SOC of the battery cells is low (e.g., 20% or 40%). If, for instance, a 3-phase machine is used with a peak voltage of 800 V together with the topology shown in FIGS. 3b and 5-7, the module voltages in every strand (also called module strand, arm, module arm) have to sum up to more than 800 V for the entire specified peak-power SOC range. Since traditional battery packs consist of hard-wired parallel and series cells, the number of total battery cells in the invention can stay the same.

The safety of the drive train can be improved, by switching the modules to a parallel, a bypass, or a passive mode/state at times when the machine is not operated. Thus, the highest voltage between any two electric contacts or metallic points in the entire system is the highest module voltage when the machine is not operated as described. Because the module voltage (preferably between 0 V and 200 V, particularly preferred 3 V to 60 V) is typically lower than the battery-pack voltage (typically in the range of 200 V to 400 V), this control rule together with the presented system is considerably safer than the conventional battery pack. In addition, magnetic components as required in the DC/DC stage can be omitted, reducing cost, space, and losses.

In conventional drive systems, an inverter, such as a number of push-pull half-bridge stages or more-level halfbridges, each formed by at least two semiconductor switches, provides the (usually alternating) voltage output for the at least one electric machine, each typically with at least one and preferably with three phases. In the invention, this function can be performed by a reconfiguration of the electrical interconnection of the modules and therefore the battery connectivity. In consequence, the invention can provide AC or multiphase voltage or current with practically free control over amplitude and frequency without the requirement of additional inverters. Furthermore, the source impedance of the invention compared is lower than that of a conventional battery if a parallel so mode/state, which connects the incorporated batteries of at least two modules in parallel, is provided by the modules and used in an appropriate control approach. With such parallel mode which can be used dynamically, the efficiency can be substantially increased compared to the state of the art.

In addition, in conventional drive systems, at least one separate charging unit (a) converts the power provided via an external charging connector (AC or DC) into DC voltage and current suitable for battery charging, (b) controls the power transfer, charging speed, charging approach/protocol (such as constant current, constant voltage or more complex charging approaches, as well as changes between phases of each), and (c) detects the end of charge. The charging unit usually incorporates a converter, which (a) increases cost, (b) requires space, and (c) increases weight. To save with respect to all three aspects, the charger is usually rated at a much lower power than the at least one electric machine, leading to long charging times.

Finally, while the one or several electric machines of conventional systems require relatively high voltages, many electrical loads, for example, lights, controllers, servos, driver assistance systems, and communication systems, commonly called auxiliaries, demand low-voltage power supply. Typically, 12 V, 24 V or 48 V are currently considered the standard for vehicles. Comparable rated voltage levels on ships, airplanes, and other vehicles deviate without loss of generality. In typical conventional systems, a DC/DC step-down converter allows exchange of energy between the drive battery and these auxiliaries. In vehicles, several units, such as the antilock braking system (ABS), the electronic stabilization program (ESP), and servo-assisted brakes can rapidly increase the current by more than 100 A, and are relevant for safety. Cost-effective DC/DC step-down converters could not follow such fast load fluctuations. Therefore, at least one conventional 12 V, 24 V, or 48 V car battery is often connected to the low-voltage side to filter and respond to respond to fast load fluctuations. However, this low-voltage battery (usually lead-acid technology) adds additional weight and cost.

The present invention splits so far typically hard-wired batteries with fixed connectivity, i.e., electrical connection of their subportions and/or cells in electrical series and/or parallel and/or bypass configurations, into at least two battery modules. A battery module according to the invention comprises at least one battery subportion and two electric switches, wherein said at least two electric switches allow a dynamic change of the connectivity of at least two battery subportions as described later. Such dynamic reconfiguration can provide at least one electric voltage of at least one electric terminal, e.g., an ac output, a dc output, or an arbitrary waveform output. Furthermore, such dynamic reconfiguration allows energy exchange between different battery modules to support, for instance, charge balancing.

BRIEF DESCRIPTION OF THE DRAWING FIGURES

FIGS. 1a, 1b, 1c show three examples of battery modules according to the invention, incorporating at least two electric switches (1105, 1106, 1107, 1108; 1207, 1208; 1307, 1308) and at least one battery subportion (1101, 1102; 1201, 1202; 1301, 1302) which comprises at least one battery cell electrically connected in series and/or in parallel configuration. Preferably, said at least one battery subportion can comprise at least one capacitor (1102; 1202; 1302).

FIGS. 2a, 2b, 2c show three alternative examples of battery modules according to the invention, incorporating at least one battery subportion (2101, 2102; 2201, 2202; 2301, 2302), which comprises at least one battery cell, which may be a capacitor.

FIG. 3a shows a an example of a drive train of a vehicle according to the state of the art with an isolated battery (3101), typically with high voltage, at least one inverter (3105), which typically generates a two-level or three-level pulse-width-modulated voltage (3106), an optional DC/DC converter (3104), an electrical machine (3107), typically AC or multiphase, a battery charger (3108), a charging plug, e.g., according to the SAE J1772, the CHAdeMO, or the Combined Charging System (CCS) standard (3109), and one or more optional step-down power converters (3102) that can convert power from the high-voltage battery (3101) to one or more auxiliary power lines (3103) and/or the other way round. All electrical connections may be equipped with additional switches, disconnectors, and/or fuses.

FIG. 3b shows a preferred embodiment of the invention, comprising at least one modular battery (3264), which includes at least six battery modules (3265) that are electrically interconnected, a auxiliary power supply bus (3255) with here 12 V, at least three battery terminals provided by said modular battery (3264) that electrically connect to at least three electrical connections of at least one electrical machine (3257). A particularly preferred embodiment, further comprises at least one charging connector (3259), e.g., according to the SAE J1772, the CHAdeMO, or the Combined Charging System (CCS) standard. For single-phase AC and DC charging, one electrical connection (3267) of its at least two electrical connections can be connected to an additional battery terminal of the modular battery (3264), e.g., the star point (3266) the modular battery (3264), which is formed by an electrical interconnection of at least three battery modules (3265), another electrical connection (3260) of the charging connector (3259) can be connected to the neutral point of one of the at least one electrical machine's winding. All electrical connections with charging connectors may be equipped with additional switches, disconnectors, and/or fuses.

FIG. 4 shows a subset of operating modes of two battery modules of an embodiment of the modular battery according to the invention, including a series positive state (4001), a series negative state (4002), a parallel state (4003), and a bypass state (4004).

FIG. 5a shows another embodiment of the invention, comprising at least six battery modules (5101-5112), at least one electric multiphase machine (5113), at least one auxiliary power supply bus (5114), e.g., with 12 V or 48 V DC, at least one charging terminal (5115) for DC or AC power, wherein the latter includes single-phase and multi-phase AC power, and at least one electronic controller (5116). In this embodiment, at least one auxiliary power supply bus is connected to at least one battery module of at least two, preferably each battery module strands and therefore can, for instance, achieve equal load on each battery module strand. The auxiliary power supply bus may comprise at least one battery and/or capacitor.

FIG. 5b shows another embodiment of the invention with at least one auxiliary power supply bus (5214), wherein said at least one auxiliary power supply bus (5214) comprises at least two charging terminals (5217, 5218), each of which is connected to another intermodule connection (5219, 5220), while preferably said intermodule connections (5219, 5220) to which said at least two terminals (5217, 5218) are connected belong to the same battery module strand (5232).

FIG. 5c shows another embodiment of the invention with at least one auxiliary power supply bus (5314), wherein said at least one auxiliary power supply bus (5314) comprises at least two charging terminals (5317, 5318), each of which is connected to another intermodule connection (5319, 5320), while preferably said intermodule connections (5319, 5320) to which said at least two terminals (5317, 5318) are connected belong to different battery module strands (5331, 5332).

FIG. 5d shows a preferred embodiment of the invention with at least one auxiliary power supply bus (5414) that comprises at least one transformer (5423), which is, for example, electrically connected to at least two intermodule connection sites (5422; 5419, 5420, 5421) through at least one pair of terminals (5417, 5418), and at least one rectifier (5424) in such a way that said at least one auxiliary power supply bus (5414) is galvanically isolated from the intermodule connection sites (5422; 5419, 5420, 5421) and the battery modules.

FIG. 5e shows a preferred embodiment of the invention wherein the at least one transformer (5523) that galvanically isolates at least one auxiliary power supply bus (5514) from the battery modules is a multiphase transformer with at least two phases on one side, preferably with at least three phases on one side and/or as many phases as the at least one electric machine (5513). Preferably, said at least one multiphase transformer (5523) further comprises as many output phases as input phases, which form the input of at least one multiphase rectifier (5524). Preferably, the terminals of the input of the multiphase transformer (5523) electrically connect to intermodule connection sites (5519, 5520, 5521) in different battery module strands.

FIGS. 5f and 5g show preferred embodiments of the invention that further comprises at least one switch (5623) that allows interrupting the electrical connection between at least one terminal of the auxiliary power supply bus (5614) and the intermodule connection site it is connected to. Preferably, the at least one switch can be operated using switching modulation, e.g., pulse-width modulation.

FIG. 6 shows another embodiment of the invention, comprising at least one auxiliary power supply bus (6014a, 6014b) that is electrically connected to at least one battery subportion of at least one battery module (6001) through at least two terminals (6017, 6018). Preferably, said at least two terminals can be electrically separated from said at least one battery subportion by at least one electric switch. The embodiment may comprise at least one transformer. Furthermore, the embodiment may comprise at least one switch that generates at least one alternating input for said at least one optional transformer.

Figure 1A:
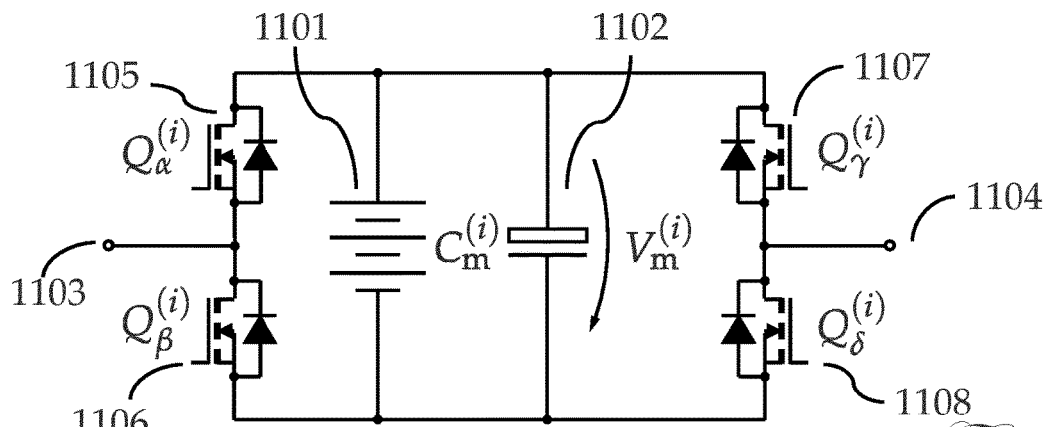
Figure 1B:
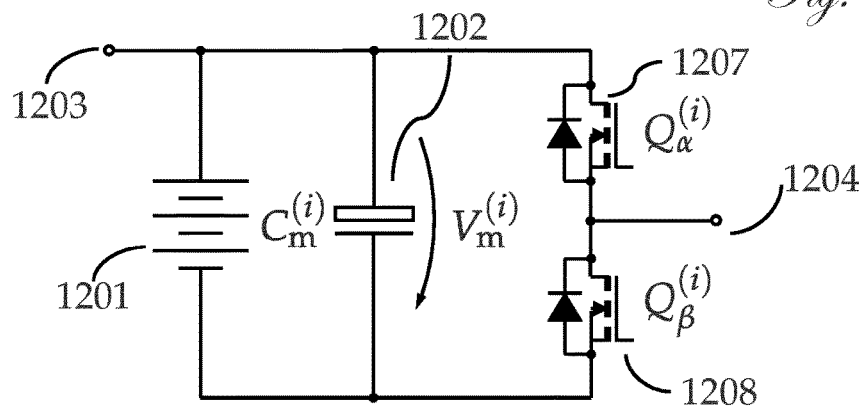
Figure 1C:
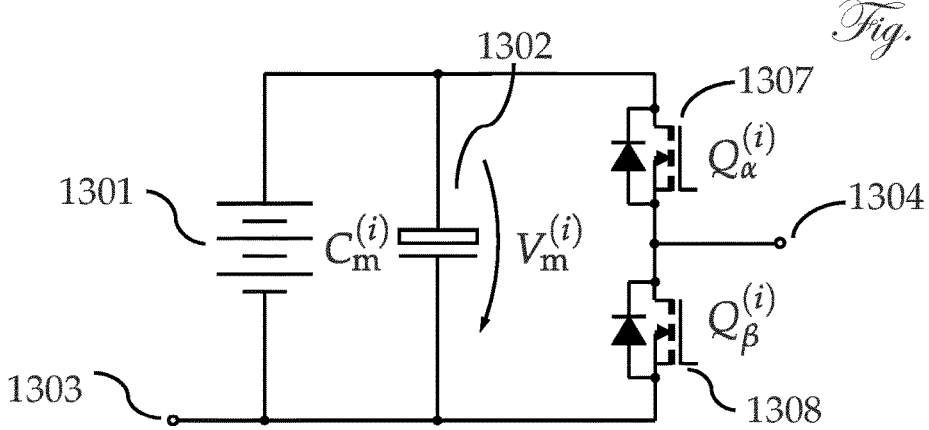
Figure 2A:
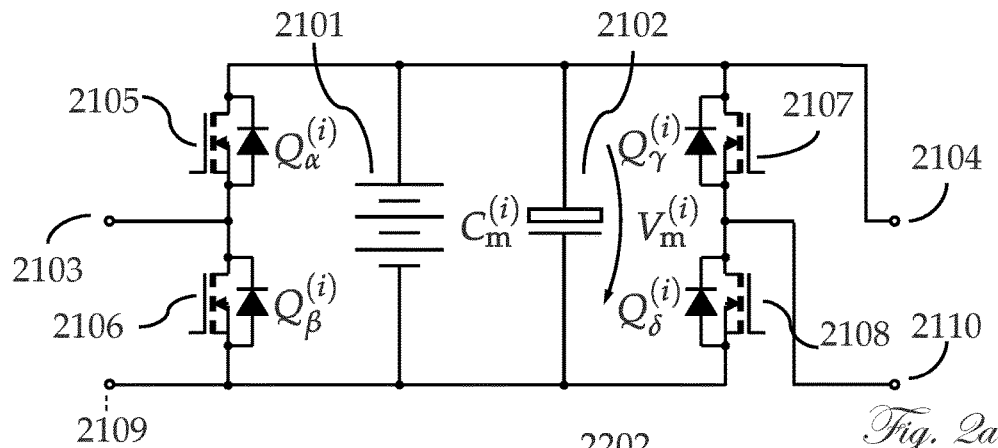
Figure 2B:
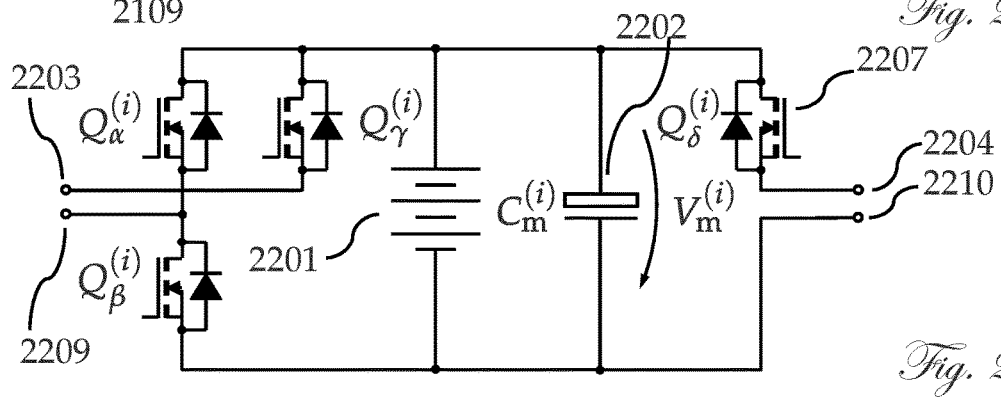
Figure 2C:
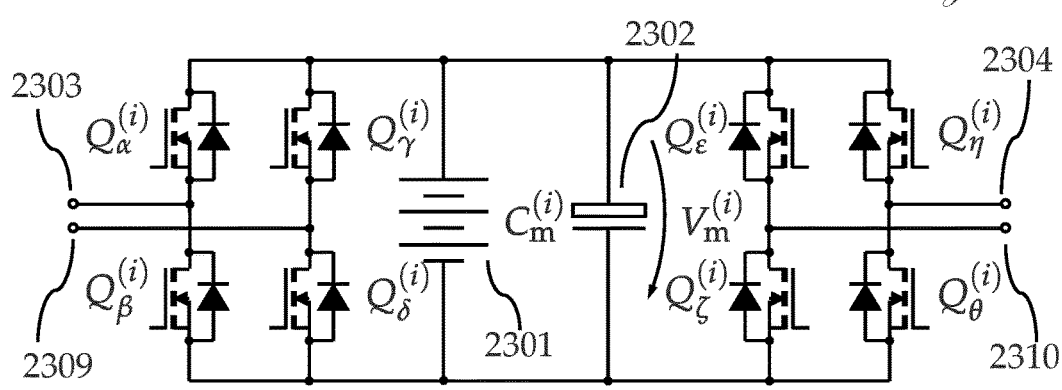
Figure 8A:
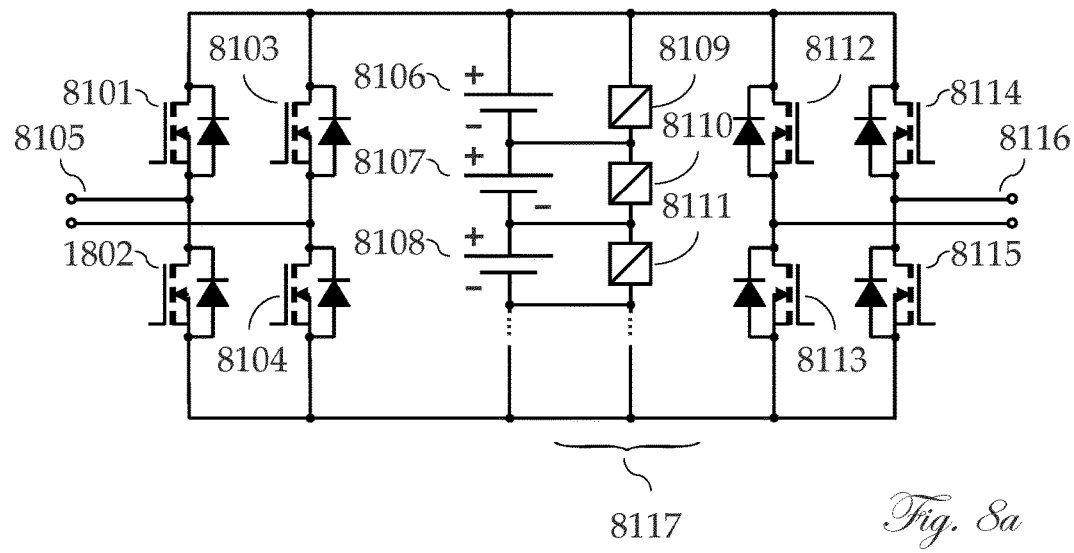

FIG. 8a shows a battery module comprising at least one voltage balancing unit (8117) consisting of at least one limiter (8109, 8110, 8111) electrically parallel to at least one battery (8106, 8107, 8108), wherein the at least one limiter (8109, 8110, 8111) can at least temporally change the charging stage of the at least one battery (8106, 8107, 8108), by discharging the at least one battery (8106, 8107, 8108), and/or transfer charge between different parts of the at least one battery (8106, 8107, 8108) and can without loss of generality also be implemented in any module type shown for instance in FIGS. 1 and 2.

Figure 8B:
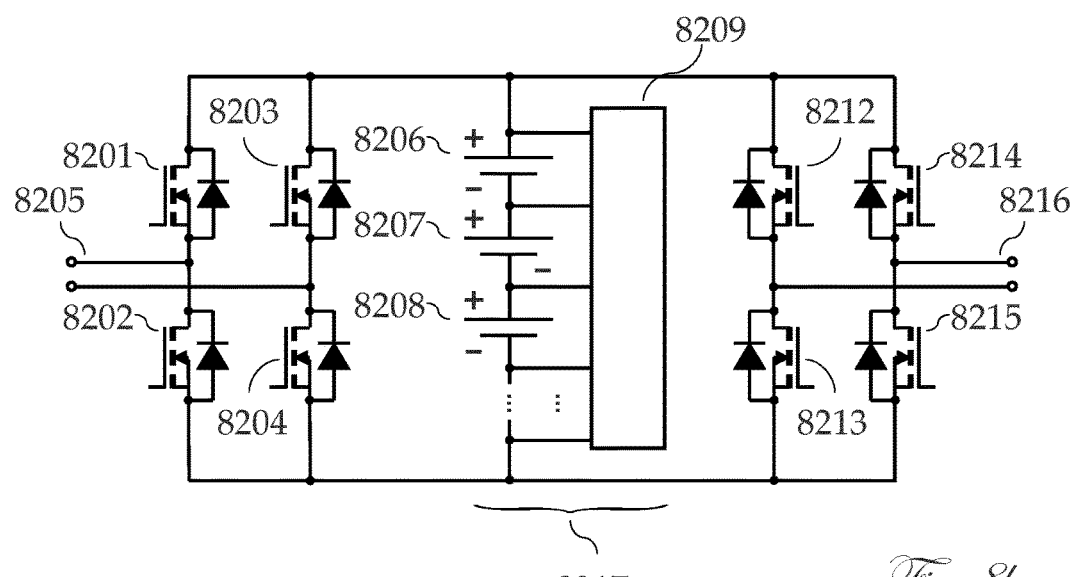

FIG. 8b shows a battery module comprising at least one voltage balancing unit (8209) that connects to at least three different electrodes of at least two batteries (8206, 8207, 8208), wherein the at least one voltage balancing unit (8209) can at least temporally change the charging stage of the at least two batteries (8206, 8207, 8208), by discharging the at least two batteries (8206, 8207, 8208), and/or transfer charge between different batteries of the at least two batteries (8206, 8207, 8208) and can without loss of generality also be implemented in any module type shown for instance in FIGS. 1 and 2.

Figure 8C:
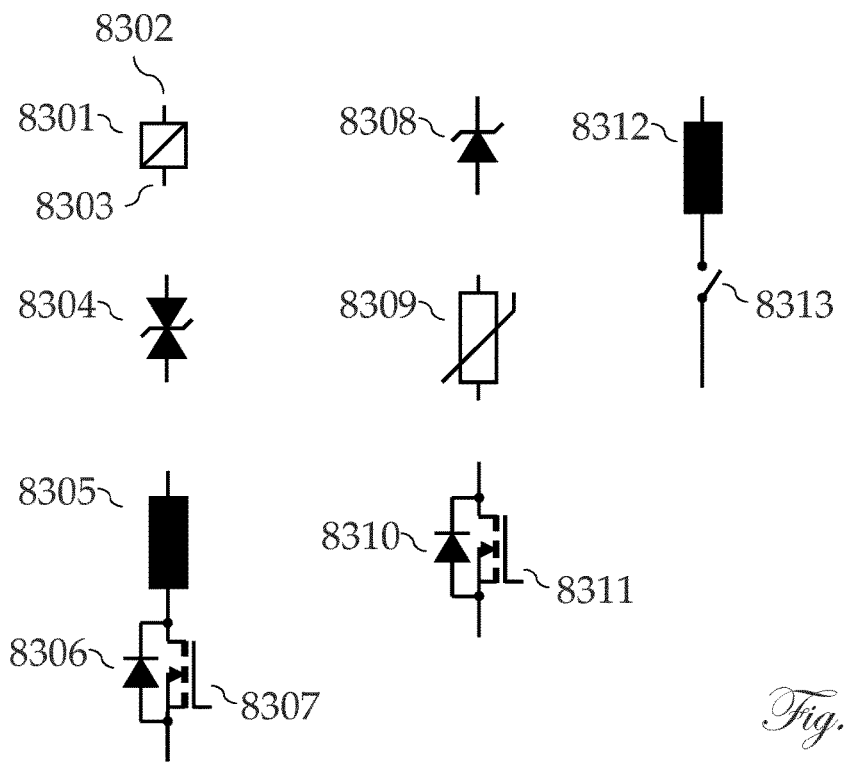

FIG. 8c shows seven different implementations of the at least one limiter (8109, 8110, 8111; 8301) according to the invention, including a transient voltage suppressor (8304), an electronic switch (8307) connected electrically in series with an impedance (8305), e.g. an electric resistance, a Zener diode (8308), a voltage dependent resistor, such as a varistor (8309), an electronic switch (8311), and an impedance (8312), such as an electric resistor, connected in series to a switch (8313).

Figure 8D:
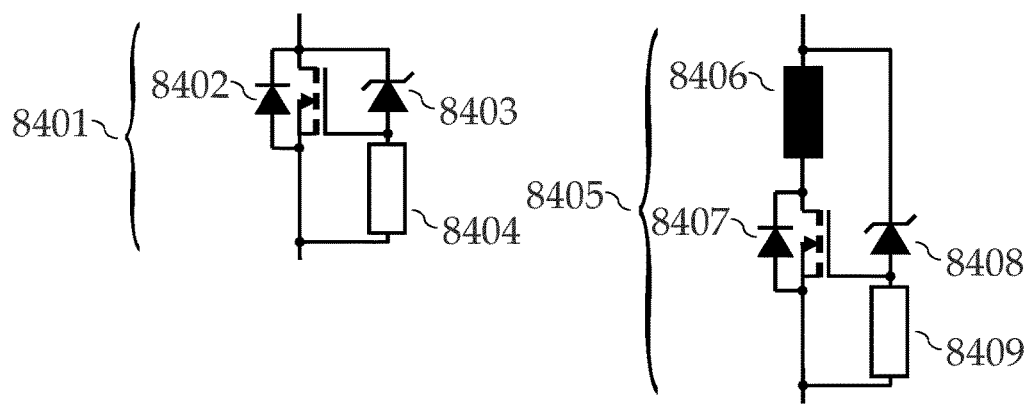

FIG. 8d shows two further implementations of the at least one limiter (8109, 8110, 8111; 8301) according to the invention which comprise at least one electronic switch (8402; 8407), which is further controlled by the voltage across the at least one limiter, e.g., using a resistor (8404; 8409) and a Zener diode (8403; 8408), a transient voltage suppressor, or the like.

Figure 9:
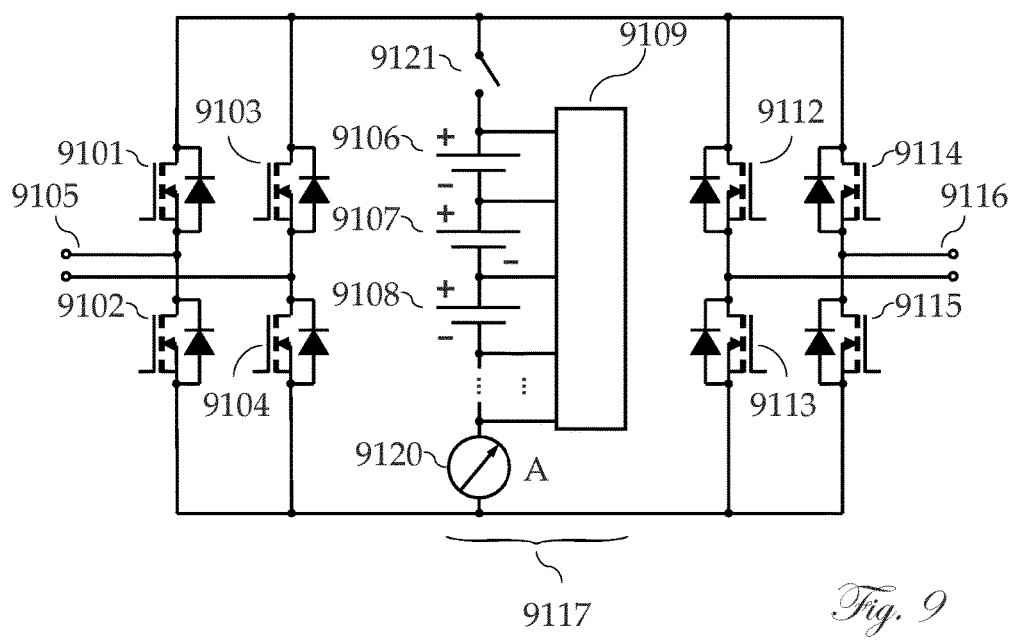

FIG. 9 shows a preferred embodiment of the invention that comprises, for instance, eight electric switches (9101-9104, 9112-9115), at least one battery subportion consisting of at least two batteries (9106, 9107, 9108), at least one voltage balancing unit (9109) and at least one current sensor (9120). Preferably, the embodiment further comprises at least one voltage sensor, which may detect the voltages of at least one individual battery cell and/or of at least one entire battery subportion and/or of parts of at least one battery subportion. Furthermore, the embodiment may comprise at least one electronic battery module control unit that processes information from said at least one current sensor and/or said at least one voltage sensor. Optionally, the embodiment may further comprise at least one electric switch (9121) that preferably allows interrupting current flow into and/or out of at least one battery subportion.

Figure 10A:
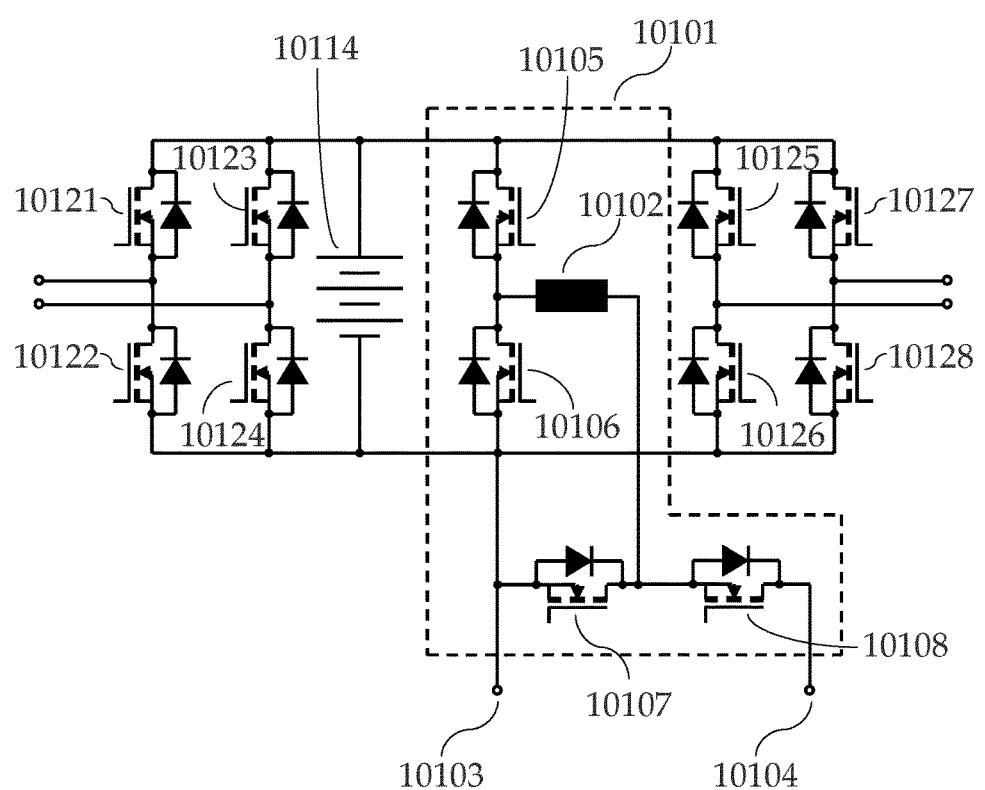

FIG. 10a shows a battery module with at least one DC/DC converting output that electrically connects to at least one auxiliary power supply bus through at least one pair of electric terminals according to the invention.

Figure 10B:
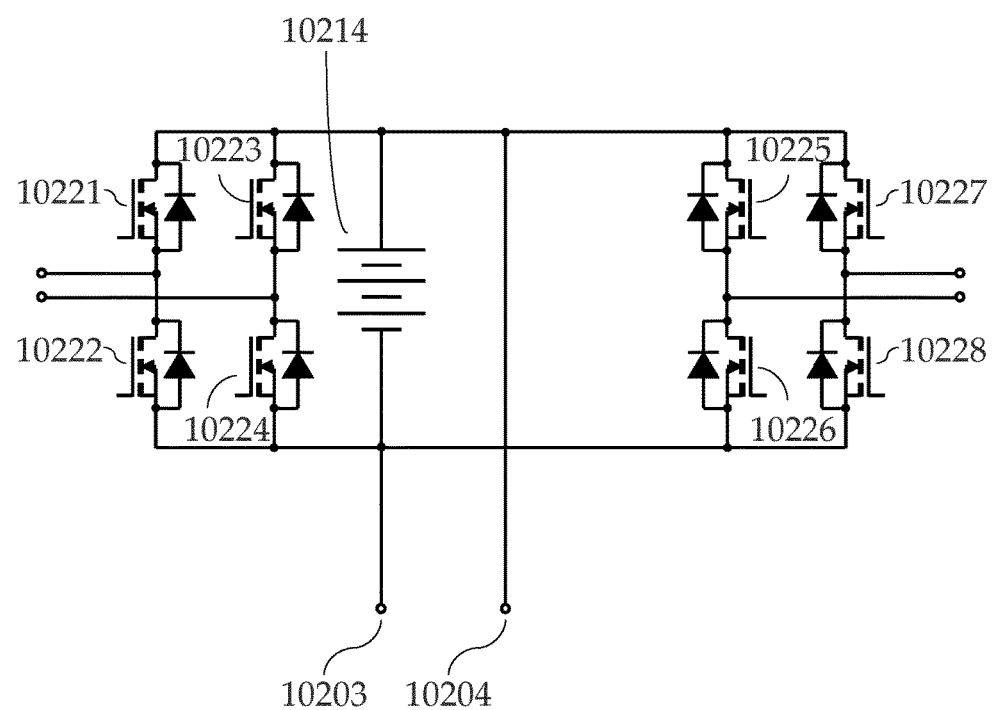

FIG. 10b shows a battery module according to the invention that incorporates terminals which connect at least one auxiliary power supply bus to at least one battery subportion of the battery module.

Figure 10C:
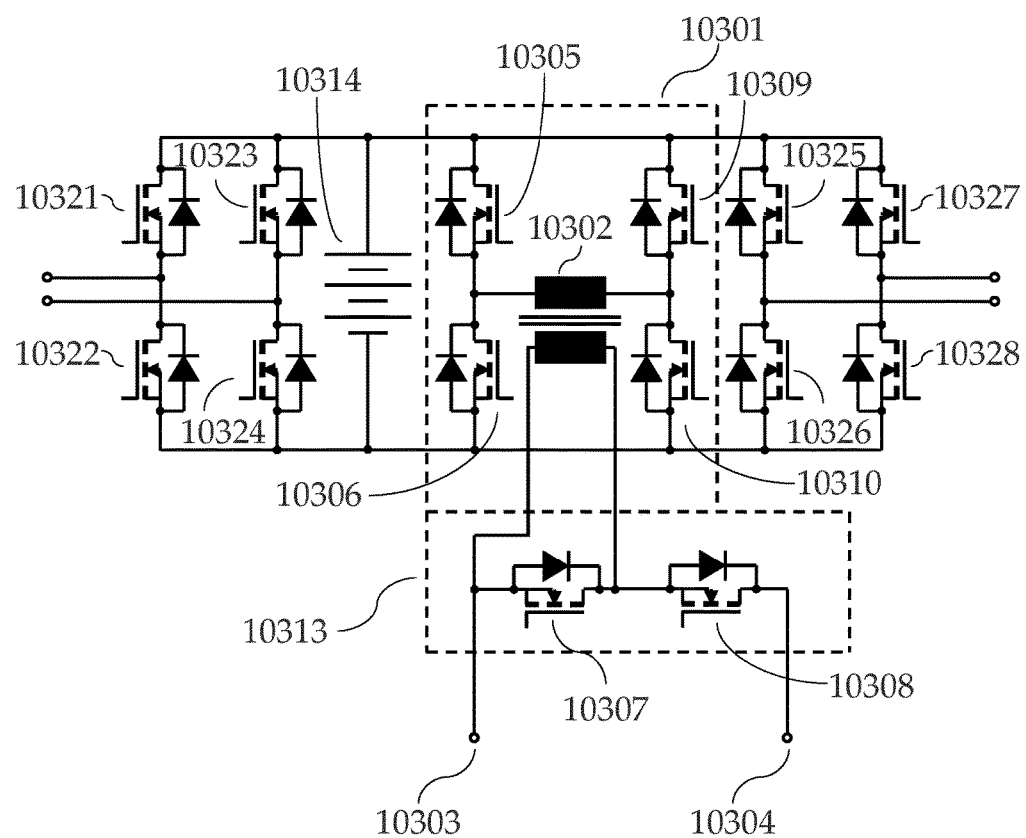

FIG. 10c shows a module with at least one galvanically isolating DC/DC converting output that electrically connects to at least one auxiliary power supply bus through at least one pair of electric terminals according to the invention.

Figure 10D:
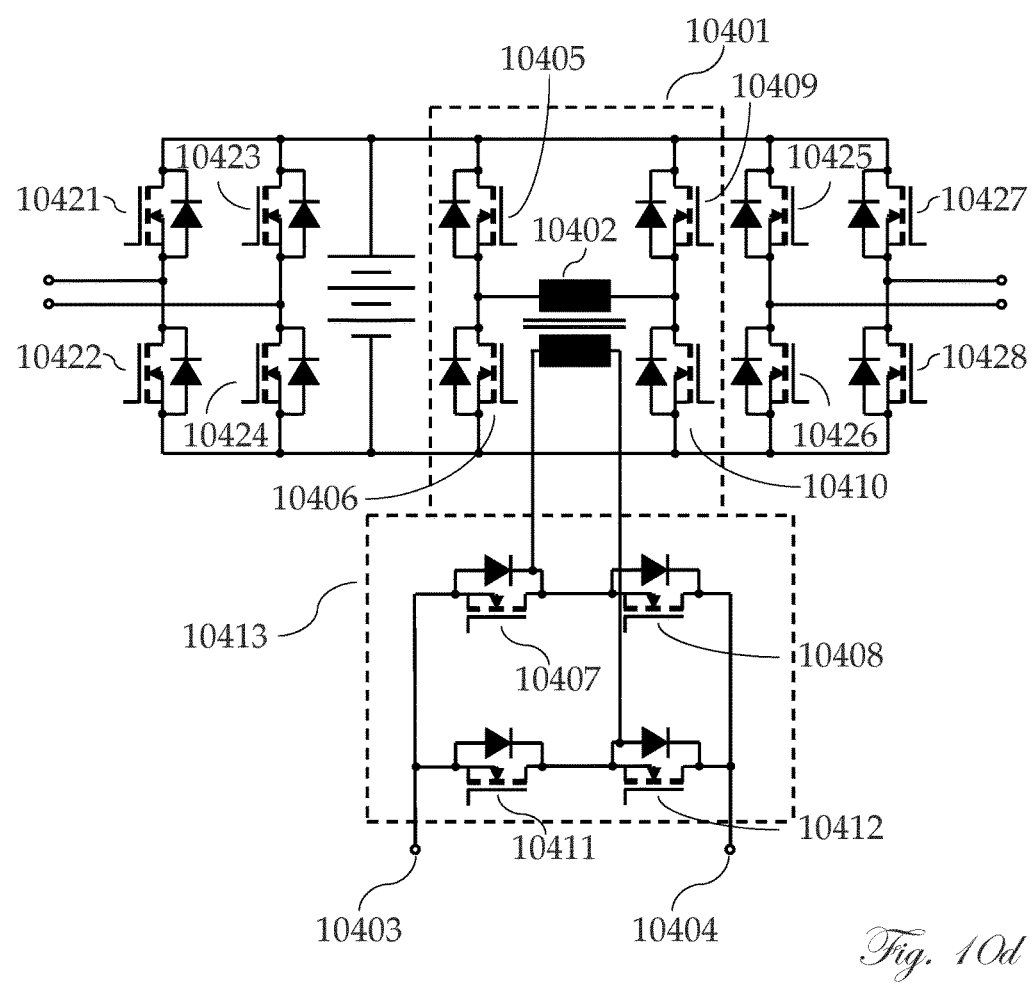

FIG. 10d shows a module with at least one galvanically isolating DC/DC converting output that electrically connects to at least one auxiliary power supply bus through at least one pair of electric terminals according to the invention.

DETAILED DESCRIPTION AND EMBODIMENTS

The invention integrates the traction battery and various power electronic converters for electric vehicles into a single, multi-function unit. Specifically, the invention can integrate the battery, traction boost converter and inverter, drive control, auxiliary power supply bus converter, and high-power charger for both AC and DC power. In addition, further functionalities that are conventionally in separate units can be incorporated into the system and efficiently performed by the same electronics, such as battery management and thermal management. The solution provides unique advantages; these include, among others, higher efficiency, lower cost, and increased reliability.

A battery and/or a battery subportion according to the present invention refers to all kinds of electrical sources and/or storage elements, including but not limited to galvanic cells, electrochemical primary cells, electrochemical secondary cells, capacitors of various kinds, including double-layer capacitors, electrolytic capacitors, as well as ceramic capacitors, DC generators, radioisotope generators, concentration cells, and fuel cells as well as electrical series and/or parallel configurations of the latter. A battery can comprise a single element of the latter, but typically comprises at least two elements, in generally denoted as battery cells, which can be of the same kind or of different kinds according to above list. Preferably a battery can comprise at least six such individual cells. A battery according to this text may further comprise electronics to control and/or monitor said battery cells. Preferably, said battery cells are DC sources. DC sources according to the invention do not necessarily require more or less regular polarity changes for operation.

A modular battery according to the invention breaks up battery packs from the state of the art, which is typically with a hard-wired configuration of electrical configurations of cells in series and in parallel, e.g., 102 series connected units, each consisting of seven lithium-ion battery cells in parallel, and typically provides a DC voltage, and segments this battery into battery modules, each comprising at least one subportion of the entire battery (so-called battery subportion), in such a way that the electrical connectivity between the battery subportions of distinct battery modules can be dynamically changed. For example, the 102 times 7 cells of such a conventional hard-wired battery could be distributed among at least 17 battery modules, each comprising at least one battery subportion with 6 series times 7 parallel cells. A battery module further comprises at least two electric switches. The subportion of the battery incorporated into a module is itself a battery and comprises at least one battery cell. Preferably, it consists of at least four battery cells, which may be in any series-parallel configuration.

In a preferred embodiment, the electrical connectivity of at least two battery subportions, each part of a different battery module, can be dynamically changed at least between the following: a series connectivity wherein the positive pole of the battery subportion of one battery module is electrically conductively connected with the negative battery subportion of the other said battery module; a bypass connectivity wherein not more than one of the at least two poles of the battery subportion of one of said modules is electrically conductively connected with another pole of a battery subportion of any other module. Each of said battery modules shares at least one electrical interconnection with another of said battery modules.

In another preferred embodiment, the electrical connectivity of at least two battery subportions, each part of a different battery module, can be dynamically changed at least between the following: a series connectivity wherein the positive pole of the battery subportion of one battery module is electrically conductively connected with the negative battery subportion of the other said battery module; a parallel connectivity the positive poles of the battery subportions of at least two battery modules and the negative poles of said at least two battery modules are electrically conductively connected, respectively. Each of said battery modules shares at least one electrical interconnection with another of said battery modules.

In another preferred embodiment, the electrical connectivity of two battery subportions, each part of a different battery module, can be dynamically changed at least between the following: a positive series connectivity wherein the positive pole of the battery subportion of a first battery module is electrically conductively connected with the negative battery subportion of the other said battery module; a negative series connectivity wherein the negative pole of the battery subportion of said first battery module is electrically conductively connected with the positive battery subportion of the other said battery module; a bypass connectivity wherein not more than one of the at least two poles of the battery subportion of one of said modules is electrically conductively connected with another pole of a battery subportion of any other module. Each of said battery modules shares at least one electrical interconnection with another of said battery modules.

In another preferred embodiment, the electrical connectivity of at least two battery subportions, each part of a different battery module, can be dynamically changed at least between the following: a positive series connectivity wherein the positive pole of the battery subportion of a first battery module is electrically conductively connected with the negative battery subportion of the other said battery module; a negative series connectivity wherein the negative pole of the battery subportion of said first battery module is electrically conductively connected with the positive battery subportion of the other said battery module; a parallel connectivity the positive poles of the battery subportions of at least two battery modules and the negative poles of said at least two battery modules are electrically conductively connected, respectively. Each of said battery modules shares at least one electrical interconnection with another of said battery modules.

In a preferred embodiment, one of the afore-described embodiments further comprises at least one electrical ac machine.

In a preferred embodiment, the invention comprises at least one electrical ac machine using permanent magnets. In another preferred embodiment, the invention comprises at least one electrical machine according to the asynchronous induction machine principle.

In another preferred embodiment, at least one of the battery modules of one of the afore described embodiments further comprises at least one pair of terminals that provides a voltage-controlled low-voltage dc voltage, preferably with 12 V, 24 V, 48 V, or 60 V, which further allows a current flow of 100 A for at least ten seconds. That voltage can be used to provide the necessary power for an auxiliary power supply bus, e.g., of an automotive vehicle, a ship, or an airplane. Typically, the auxiliary power supply bus of vehicles is represented by at least two terminals, one of them representing the plus terminal, e.g., of a twelve-volt voltage, the other one the minus terminal that is often connected to the car body. Common industry standards, including DIN 72552, substantiates how auxiliary power supply busses in vehicles can be set up and which components, such as so-called Terminal 31 for the negative terminal of an auxiliary power supply bus, Terminal 30 for the positive terminal of an auxiliary power supply bus, and several related terminals, such as Terminal 15, they can comprise.

In another preferred embodiment, the invention comprises at least one battery module containing at least one battery subportion with a low-voltage dc voltage, preferably 12 V, 24 V, 48 V, or 60 V, wherein said at least one battery module further comprises at least one pair of electric terminals that electrically connect at least one of said at least one battery subportion to at least one auxiliary power supply bus. Preferably, the voltage of the at least one auxiliary power supply bus equals the voltage of the at least one battery module that is electrically connected to said at least one auxiliary power supply bus through said at least one pair of electric terminals. The auxiliary power supply bus can be directly connected to at least one battery subportion, which is incorporated into a battery module.

Figure 6:
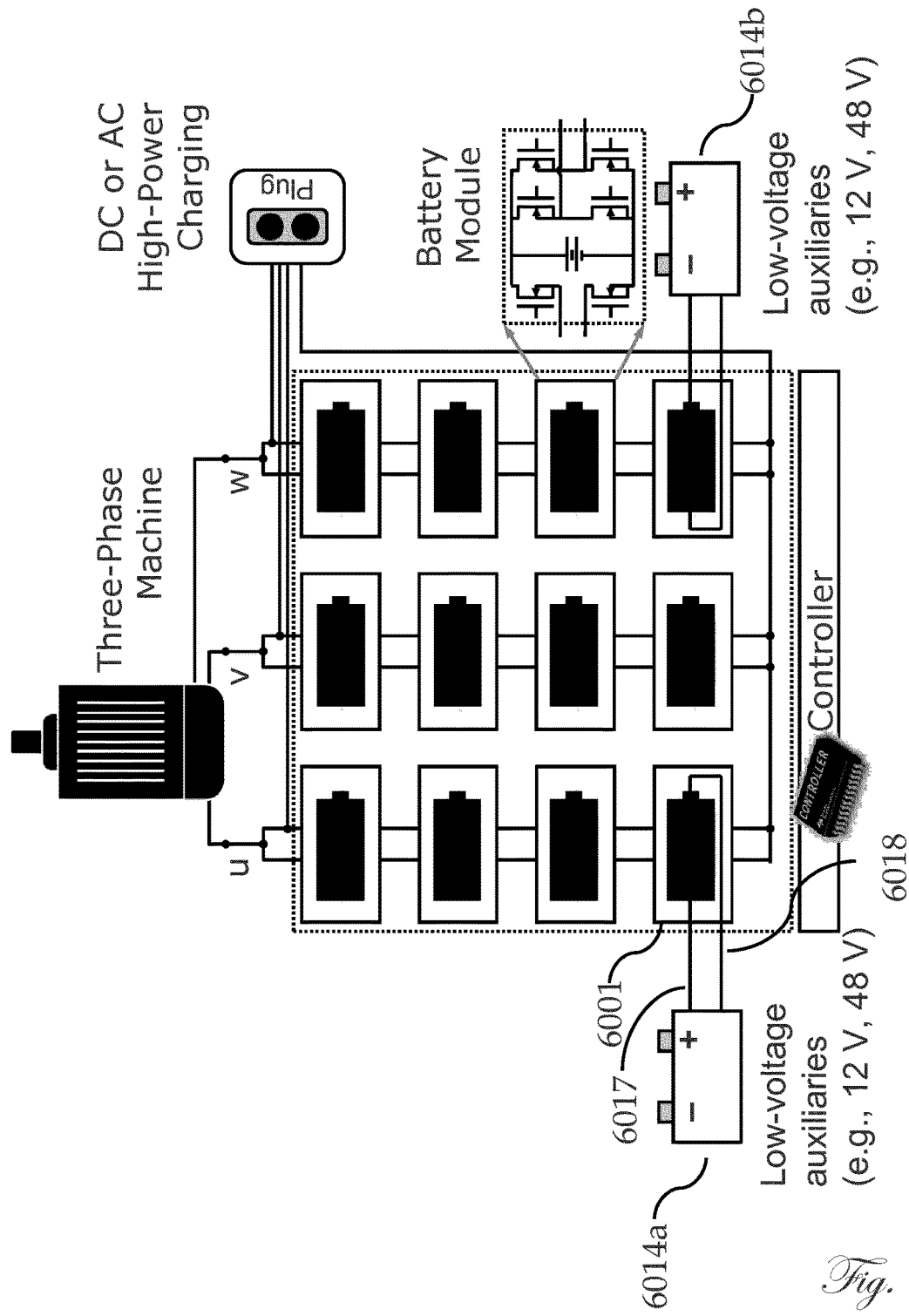
Figure 7A:
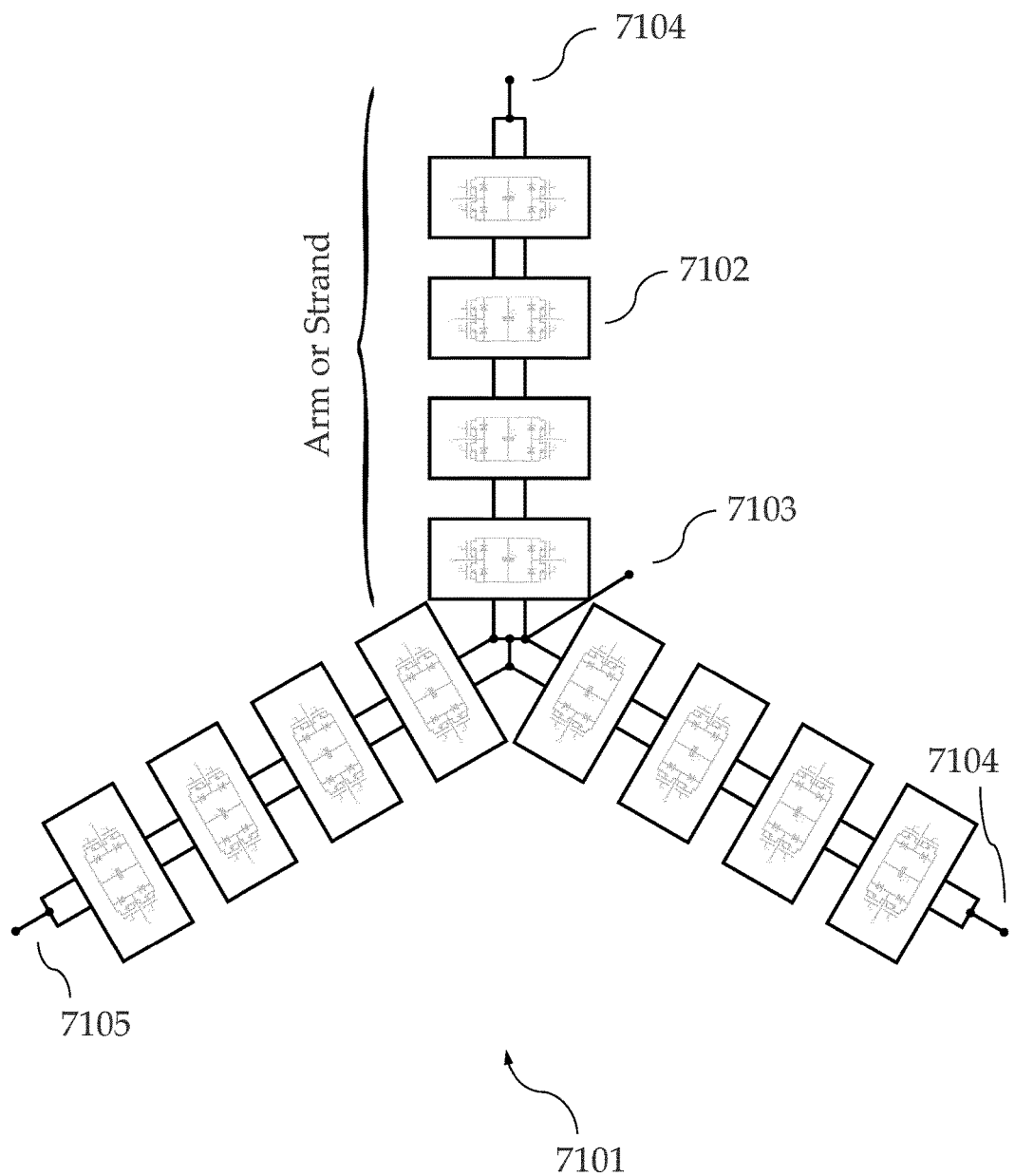
FIG. 7a shows a preferred structure combining individual modules (7102) to a power supply according to the invention.
Figure 7B:
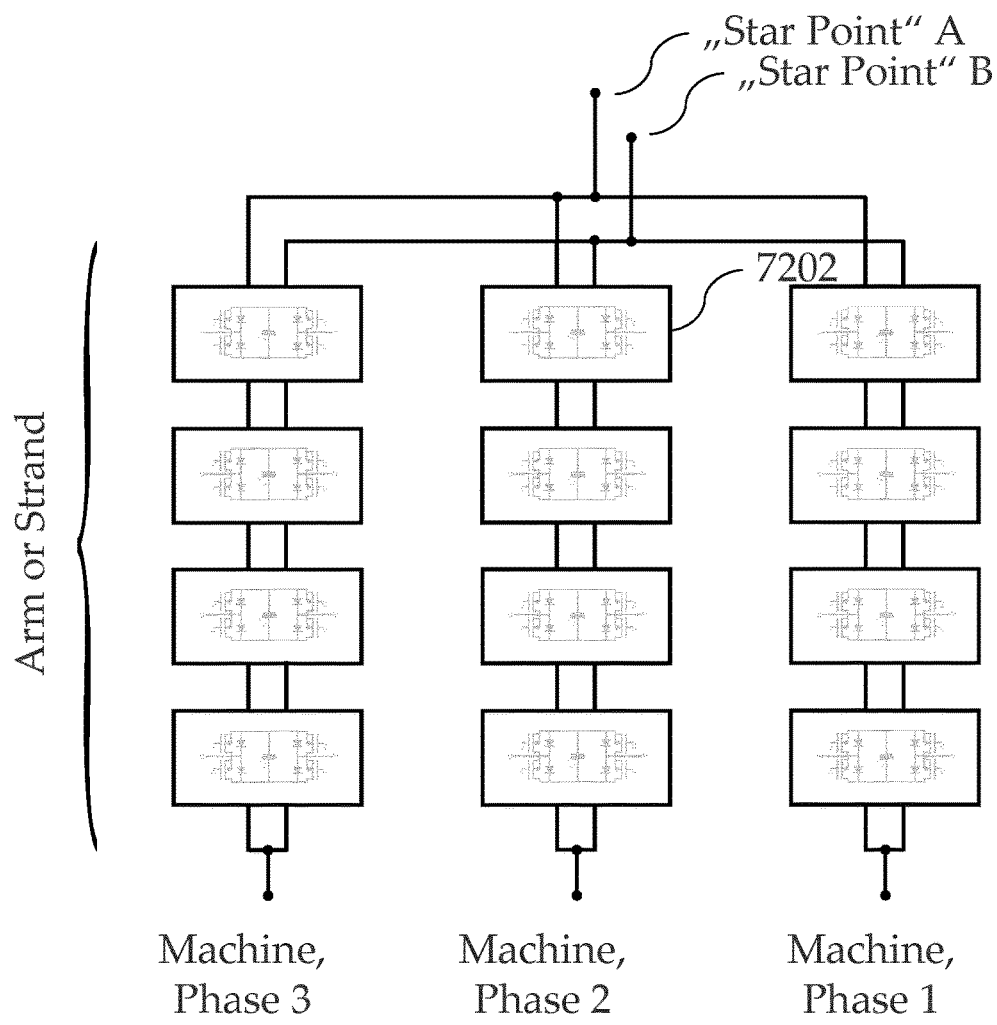
FIG. 7b shows another preferred structure combining individual modules (7202) to a power supply according to the invention.

FIG. 6 presents an embodiment that comprises at least six battery modules and at one electric machine, preferably with at least three phases. Further, the figure shows two battery modules each of which further comprises at least one pair of electric terminals that electrically connects to at least one auxiliary power supply bus. The at least one battery subportion incorporated into each of said battery modules provides the power for the auxiliary power supply bus through said at least one pair of electric terminals of each said battery module. As said battery modules are further electrically connected with other modules and allow a dynamic reconfiguration of the connectivity between the battery portions incorporated into said modules, power can be exchanged with the other modules and the auxiliary power supply busses. The invention does not have any preferred direction of current or power flow. Thus, it allows a bidirectional power exchange between auxiliary power supply busses and the battery with very high efficiency. Switching control or magnetic components, which would increase losses, are not necessarily required.

Furthermore, the depicted embodiment and embodiments derived from it do not necessarily involve switching modulation for an auxiliary power supply bus if it is electrically connected to at least one battery portion with the same voltage as said auxiliary power supply bus. This substantially simplifies control and allows. Furthermore, it allows fast and high load power fluctuations of the auxiliary power supply, which are, for instance, a key issue in conventional cars. Fast and high load fluctuations lead DC/DC converters as implemented in conventional vehicles, ships, airplanes and the like, which need to actively control their output voltage and/or power with switching modulation, to or above their limits and renders low-voltage buffer batteries necessary in conventional systems.

Preferably, the invention comprises at least two battery modules, each containing a battery subportion with a low-voltage dc voltage, preferably 12 V, 24 V, 48 V, or 60 V, and wherein each battery module further comprises at least one pair of electric terminals that electrically connect to at least one auxiliary power supply bus, and wherein the at least one auxiliary power supply bus electrically connected to one of said at least two battery modules is not electrically connected to any other of said at least two battery modules so that at least two independent power supply busses are formed, and wherein the invention further comprises at least two auxiliaries that fulfill the same function, wherein each of at least a group of two of said auxiliaries are supplied with power by electrical connection to a different bus of said independent power supply busses.

Preferably, the at least two auxiliaries that fulfill the same function provide safety function, such as power-assisted steering (PAS), anti-lock braking system (ABS), electronic stability program (ESP), brake control, passenger airbags, and emergency brake assist systems, as well as electronic control units (ECU) of any of the latter.

The safety and risk characteristics of auxiliaries are typically specified by an Automotive Safety Integrity Level (ASIL) according to international standard ISO 26262. A failure of auxiliaries and function of the higher ASIL classes may cause major hazards including passenger lives and therefore are supposed to provide means against failure, including both failure of the auxiliary as a device and all constraints, such as power, risking a failure. In the present invention, auxiliaries with ASIL C and D and/or the functions provided by auxiliaries with ASIL C and D are considered safety relevant, while the requirement for redundant implementation and redundant power supply as described increases from ASIL A to D. The present invention allows both independent implementations of safety-relevant auxiliaries and/or functions in redundant units to guarantee operation after a failure and power supply of the independent instances through said independent auxiliary supply busses.

Preferably, all auxiliaries in a vehicle according to the invention are grouped to safety power groups in such a way that such auxiliaries which may not fail at the same time are powered by electrical connection to independent power supply busses, each electrically connected to different battery modules.

A preferred embodiment of the invention comprises at least two battery modules, each containing a battery subportion with a low-voltage dc voltage, preferably 12 V, 24 V, 48 V, or 60 V, wherein each of said at least two battery modules further comprises at least one pair of electric terminals that electrically connect to at least one auxiliary power supply bus, and wherein at least one of said auxiliary power supply busses that is electrically connected to a first battery module of said at least two battery modules is different in voltage by more than 30% compared to another of said auxiliary power supply busses that is electrically connected to a second battery module of said at least two battery modules. Preferably, the voltage difference is more than 50%. Preferably, the voltage of one of said auxiliary power supply busses is by more than a factor of two higher than the voltage of another one of said auxiliary power supply busses. Preferably, the rated voltage of one of said auxiliary power supply busses is 48 V±12 V, whereas the rated voltage of another one of said auxiliary power supply busses is 12 V±6 V.

Figure 5A:
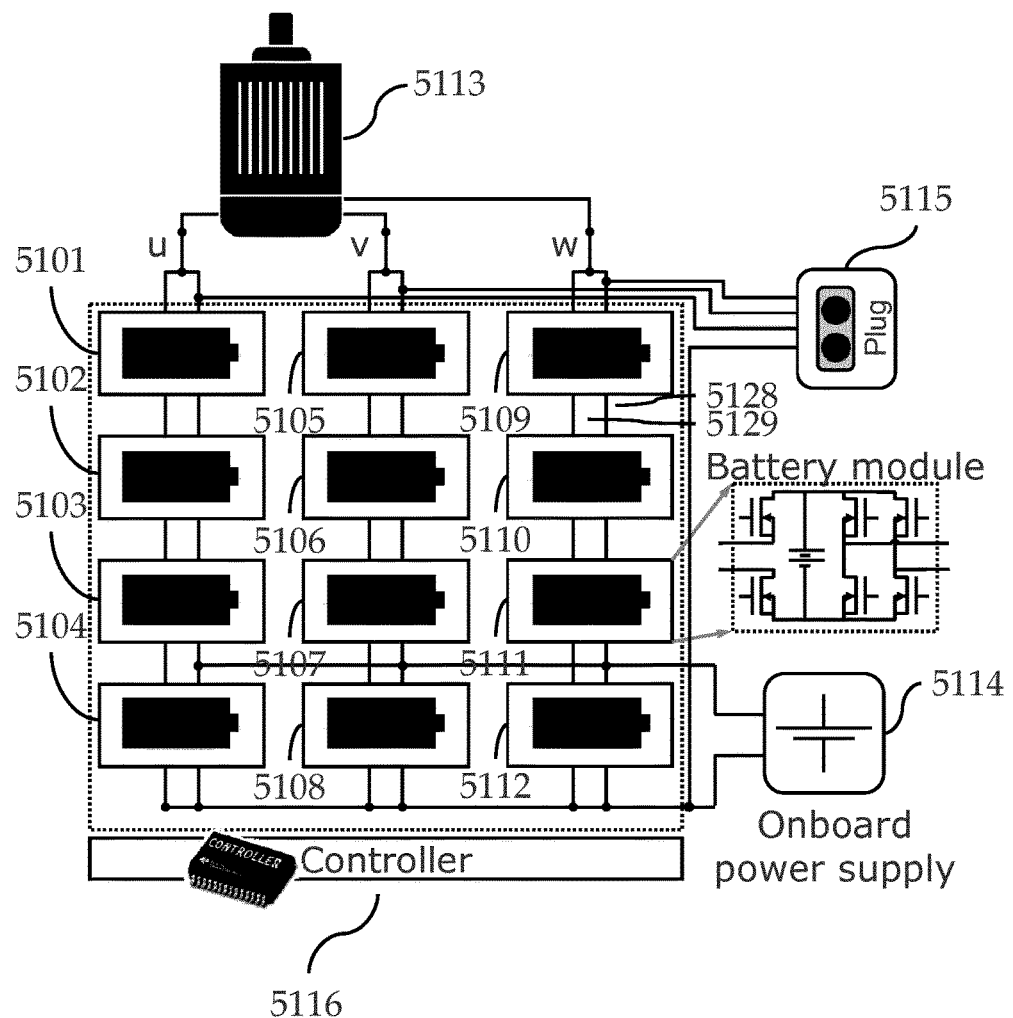
Figure 5B:
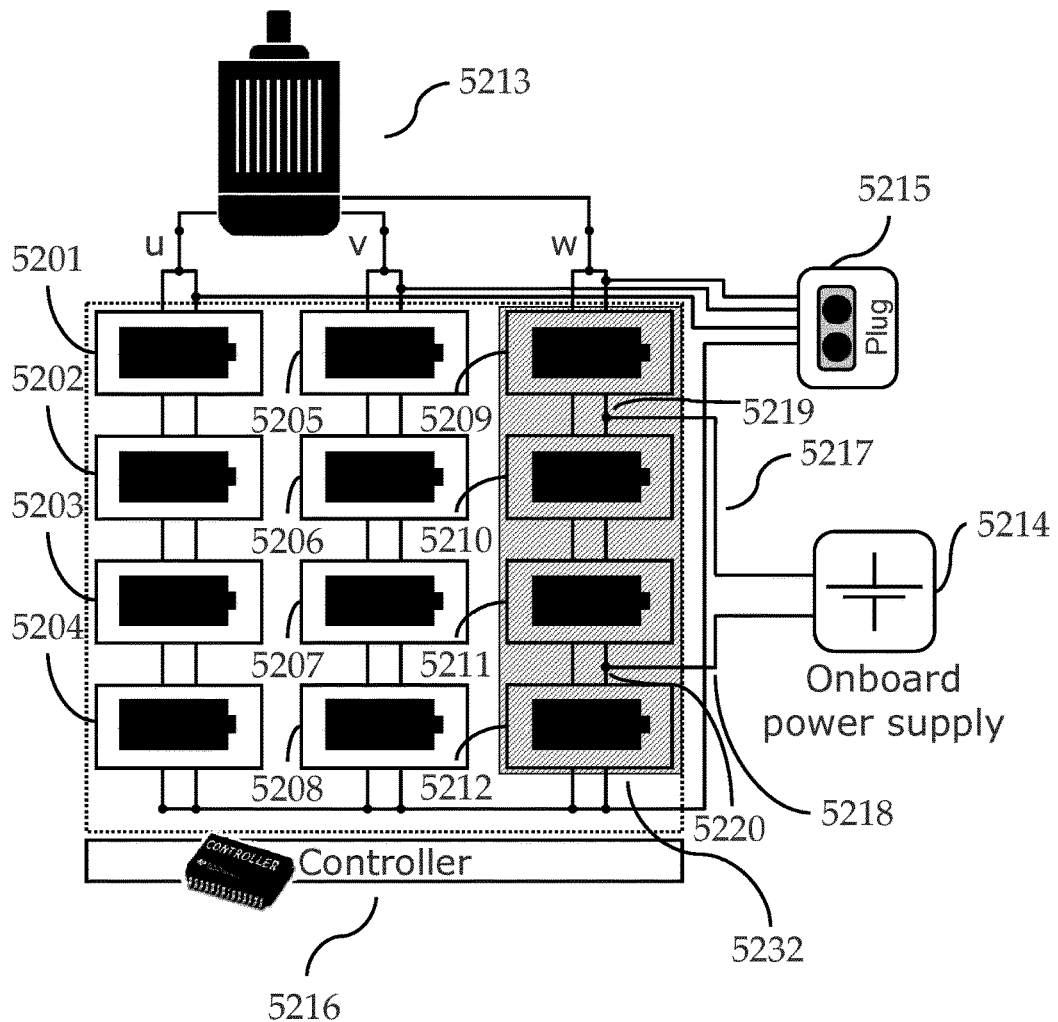
Figure 5C:
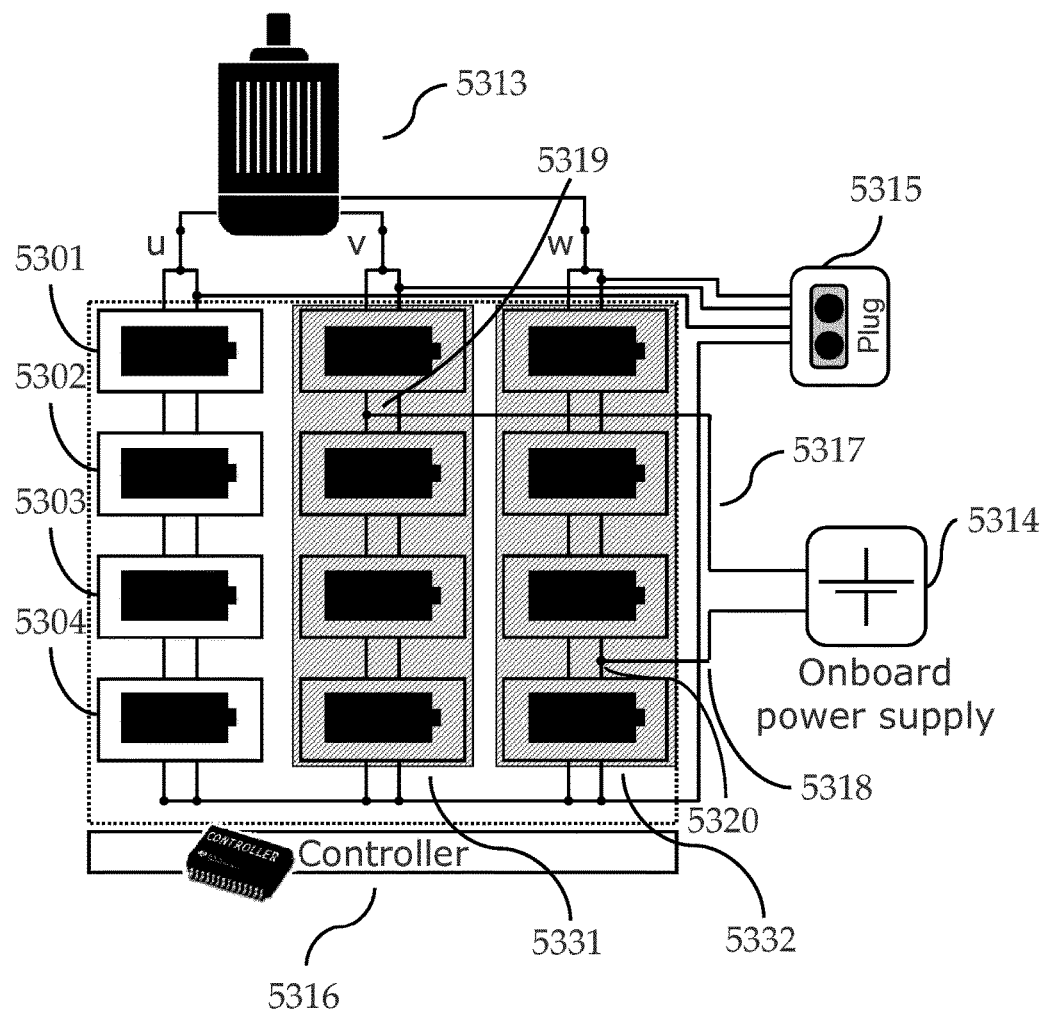
Figure 5D:
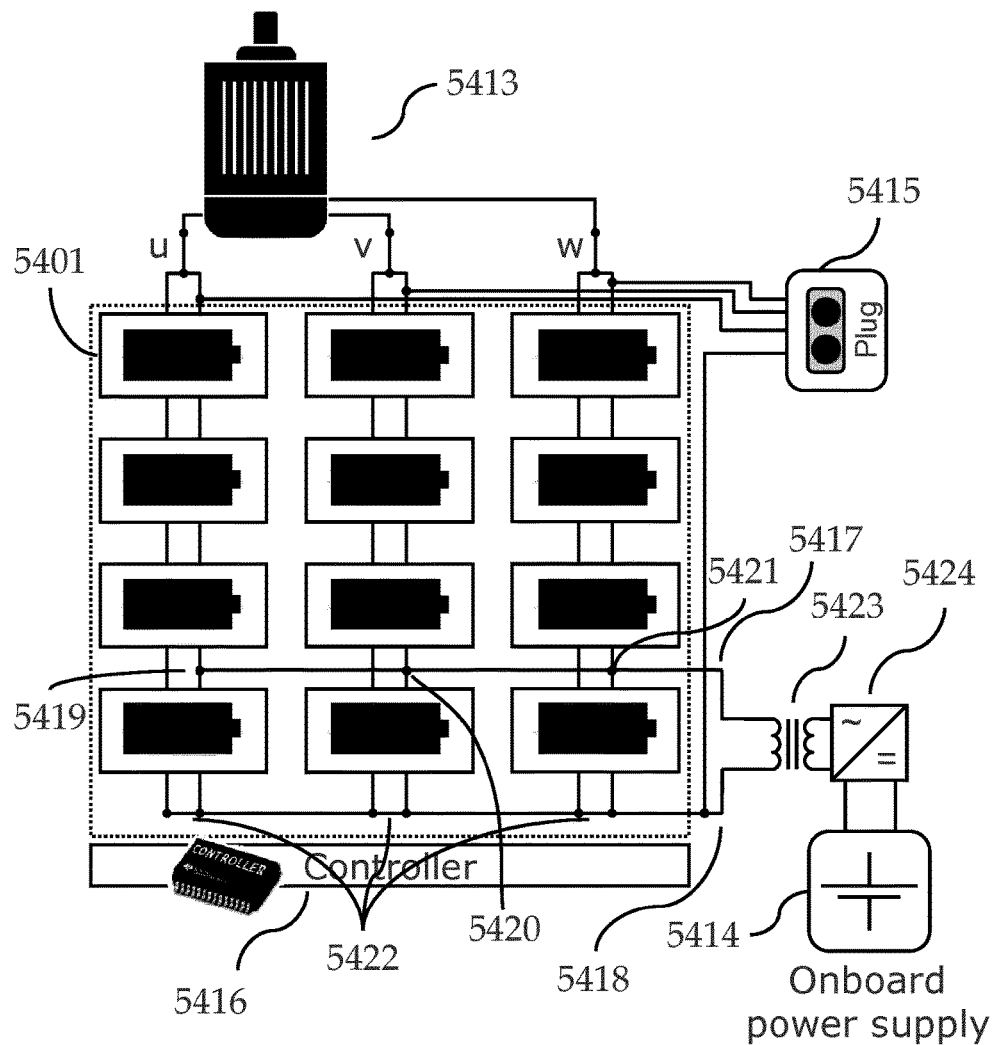

FIGS. 5a-5c show an additional or alternative way of generating one or more low-voltage connections to at least one auxiliary power supply bus.

Key advantages of auxiliary power supply busses implemented according to these embodiments can be supplied with any form of output, such as DC voltage, AC voltage, as well as current controlled output and that the voltage of auxiliary power supply busses does not determine the voltage of battery subportions incorporated into battery modules since the voltages and/or the currents of auxiliary power supply busses implemented according to these embodiments can be controlled by appropriate temporal control of switching states of battery modules.

Alternatively, one or more auxiliary power supply busses can likewise be connected pairwise to any at least two battery-module interconnections, which electrically interconnect at least two battery modules, as demonstrated in FIGS. 5b and 5c. Furthermore, each of the connection points, which electrically connect the terminals of the at least one auxiliary power supply to at least one module interconnection, can shorten several different battery-module interconnection lines. As shown in FIG. 5a, at least one connection of an auxiliary power supply bus can, for instance, shorten batter-module interconnections of different arms. An important advantage of such shortening is that several modules and/or electric switches can be operated in parallel.

If the voltage of one specific auxiliary power supply busses is the voltage of any series and/or parallel configuration of the one or more battery portions incorporated into those battery modules that a current has to pass when it flows from one terminal, i.e., electrical connection point with at least one battery module, of said auxiliary power supply bus to the other terminal, the voltage control of said auxiliary power supply bus is simplified and does not need fast switching regulation. Instead the system may use all those series and/or parallel configurations of said modules that provide the required voltage and slowly alternate between them in order to provide similar load to each battery subportion.

Figure 5E:
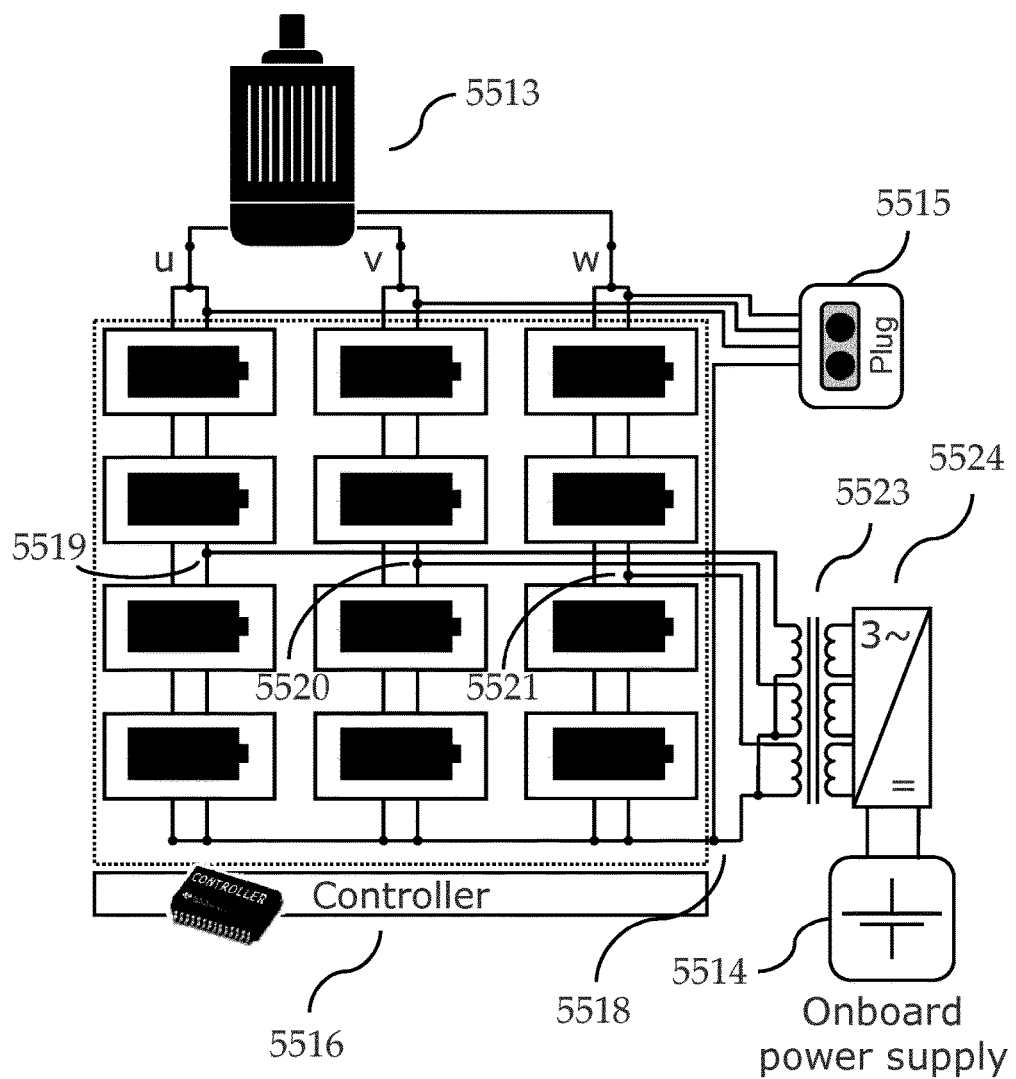
Figure 5F:
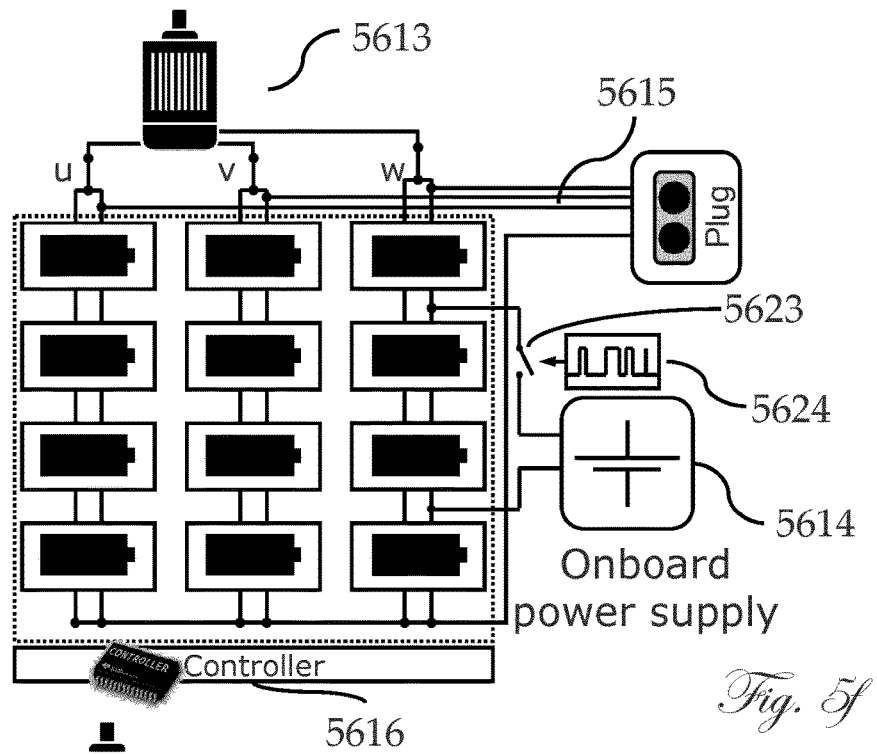
Figure 5G:
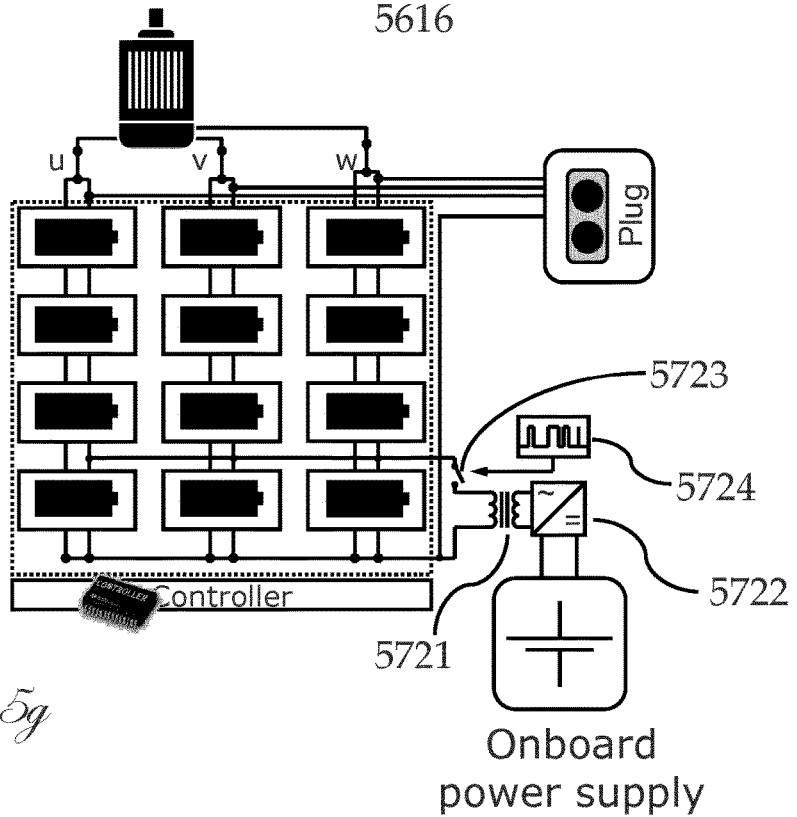

Preferably, at least one auxiliary power supply bus is galvanically isolated from the high-voltage system and thus from any battery module. The latter can, for example, be achieved by including at least one transformer. Such transformers can be single-phase transformers or multiphase transformers. The transformation ratio further allows adjusting the voltage-current load on the battery modules. As FIG. 5e shows, a multiphase transformer can be connected with delta or star configuration to any battery-module interconnections; furthermore, the 2n primary-side terminals of an n-phase transformer can more generally be electrically connected to any 2n different battery-module interconnection.

If the auxiliary power supply further requires DC voltage, a rectifier can convert the AC output required by the transformer to DC voltage. Preferably, a multiphase rectifier, fed by at least one multiphase transformer and/or more than one single-phase transformer, can generate an output voltage with lower voltage and/or current ripple. Rectifier according to the present invention can be any electronic unit that converts AC power to DC power, e.g., passive rectifiers, such as diode-rectifiers, and active rectifiers, such as switching-mode AC/DC converters. Such rectifier may be bidirectional to allow discharging of capacitance in an auxiliary power supply bus or recovery of energy from generative auxiliaries connected to an auxiliary power supply bus.

Another embodiment of the invention comprises at least two battery modules, wherein each of the battery modules comprises at least one battery subportion; the embodiment further comprises at least one auxiliary power supply bus with at least two electric terminals, wherein each of at least two of said electric terminals is electrically connected to at least two intermodule connections. Preferably, said at least two intermodule connections electrically connect at least two battery modules to each other and are noncongruent. Preferably, the rated voltage of at least one of said auxiliary power supply busses is DC. Preferably, the voltage of at least one of said auxiliary power supply busses further is a multiple of 12 V or deviates on average by only 20% from a multiple of 12 V.

Preferably, the embodiment furthermore comprises at least one switch and/or disconnector so that the current flow between at least one of said electric terminals which electrically connect to intermodule connections can be turned off. Preferably, said at least one switch and/or disconnector allows turning off any current flow between any battery module and at least one of said auxiliary power supply busses. Preferably, said at least one switch is a semiconductor switch. Preferably, said at least one switch can perform pulse-width modulation to adjust the voltage of at least one auxiliary power supply bus and/or the current through said at least one switch and is controlled by at least one electronic controller. Preferably, said at least one disconnector is able to galvanically separate the at least one terminal of at least one auxiliary power supply bus from at least one intermodule connection and/or from any battery module.

Alternatively or additionally, the embodiment further comprises at least one transformer with at least one phase, preferably at least three phases. Preferably, the embodiment further comprises at least one AC/DC converter and/or at least one rectifier, of which at least one converts the output of at least one of said transformers into a DC voltage.

In a preferred embodiment, the sum of the maximum voltages of the battery modules, whose battery subportions can be switched in series to others such that the voltage between said at least two terminals of said at least one auxiliary power supply bus is effectively increased, is within 20% of the rated voltage of said at least one auxiliary power supply bus.

Alternatively, the sum of the maximum voltages of the battery modules, whose battery subportions can be switched in series to others such that the voltage between at least two terminals of at least one auxiliary power supply bus is effectively increased, exceeds the rated voltage of said at least one auxiliary power supply bus, preferably by more than 25%.

The latter embodiment advantageously allows adjusting as well as controlling the voltage of the at least one auxiliary power supply bus by appropriate selection of the battery module states of said battery modules; such control may be static, i.e., the voltage of said at least one auxiliary power supply bus is set without or with rare (e.g., <1 Hz) battery module state changes, or by switching modulation, i.e., by rapid changes between at least two battery module states so that the temporal average of the at least one auxiliary power supply bus voltage meets its rating. Furthermore, the higher the possible maximum voltage of said battery modules is the more it allows use of parallel battery module states to reduce conduction loss and higher current capability.

Alternatively, the required voltages between the at least one pair of points where the at least one auxiliary power supply bus is connected can be formulated as equations in dependence of the battery module states and the battery subportion voltages and added as constraints to the at least one electronic controller of the drive train, which decides over the reconfiguration of module connectivity by selecting the battery-module state to be set.

Alternatively or additionally, the invention can comprise at least one battery module that incorporates at least one DC/DC converting output that electrically connects to at least one auxiliary power supply bus through at least one pair of electric terminals. FIG. 10a shows an arbitrary battery module from FIGS. 1 and 2 that incorporates a DC/DC converting output (10101) that provides terminals (10103, 10104) for an electrical connection to at least one auxiliary power supply bus. The DC/DC converting output (10101) comprises at least one inductance (10102) and at least one electronic switch (10105, 10106, 10107, 10108), which can, for instance, be operated as buck converter and/or as buck-boost converter to convert the module voltage represented by the voltage of the energy storage (10114), such as a battery portion, to a different voltage level, preferably the voltage level required for the operation of the at least one auxiliary power supply bus. Instead of a DC/DC converting output according to a buck-boost technology, other DC/DC converting circuits, such as buck converter or boost converter circuits, can be implemented likewise. Furthermore, the DC/DC converting output may use a resonant, zero-current switching, or zero-voltage switching DC/DC converting circuit.

FIG. 10b shows an arbitrary battery module from FIGS. 1 and 2 according to the invention that incorporates terminals (10203, 10204) connected to at least one auxiliary power supply bus. As also shown in FIG. 6, said terminals (10203, 10204) that are connected to at least one auxiliary power supply bus are connected to at least two different electrodes of the energy storage (10214) and therefore providing direct electrical access to the energy storage to the at least one auxiliary power supply bus.

FIGS. 10c and 10d show arbitrarily selected battery modules from FIGS. 1 and 2 that comprises at least one isolated DC/DC converting output, e.g., consisting of at least one inverter (10301; 10401) as well as at least one rectifier (10313; 10413), and terminals (10303, 10304; 10403, 10404) according to the invention, wherein said terminals (10303, 10304; 10403, 10403) connect to at least one auxiliary power supply bus. The isolated DC/DC converting output comprises at least two electric switches (10305, 10306, 10307, 10308, 10309, 10310; 10405, 10406, 10407, 10408, 10409, 10410, 10411, 10412) at least one transformer (10302; 10402), which provides a galvanic isolation between the at least one energy storage of the battery module and said at least one auxiliary power supply bus. Electric switches of the rectifier can without loss of functionality be implemented as semiconducting rectifiers, such as diodes, which may be implemented, for instance, as a single diode, several diodes, or a bridge rectifier, rectifying the electric output of the at least one transformer (10302; 10402) such that the polarity of the terminals (10302, 10304; 10402, 10404) matches the polarity of the at least one connected auxiliary power supply bus. The isolated DC/DC converting output may be able to operate bidirectionally, i.e., with power flow in both directions, as shown in FIGS. 10c and 10d, or unidirectionally, i.e., with power flow from the at least one energy storage of the battery module to the at least one connected auxiliary power supply bus or vice versa.

Low-voltage is considered to be any voltage that is lower than the maximum drive voltage of any connected electric machine. Preferably, the voltage of auxiliary power supply busses is lower than 120 V. In particularly preferred embodiments, the voltage of auxiliary power supply busses is at maximum 60 V.

Figure 3A:
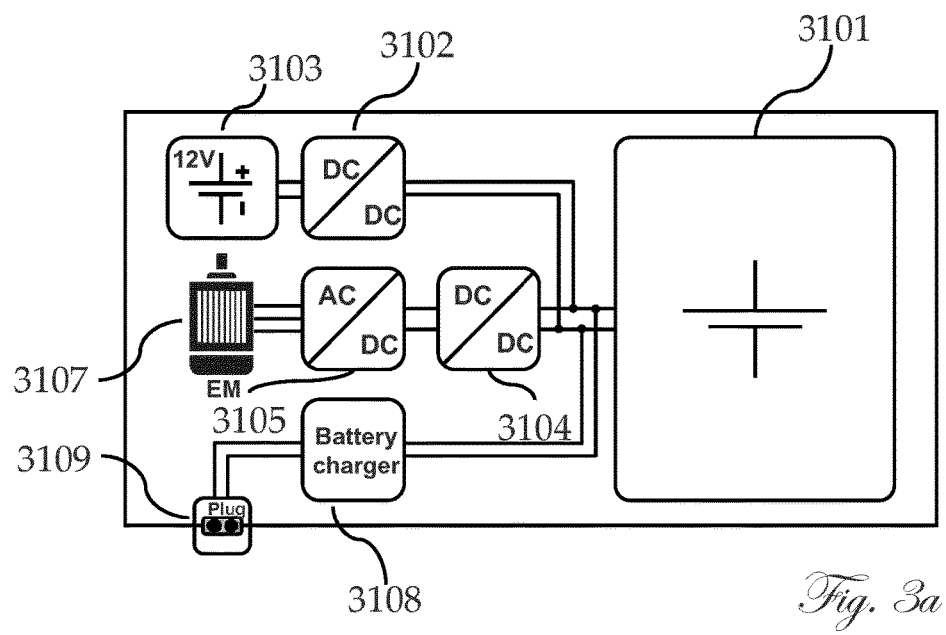
Figure 3B:
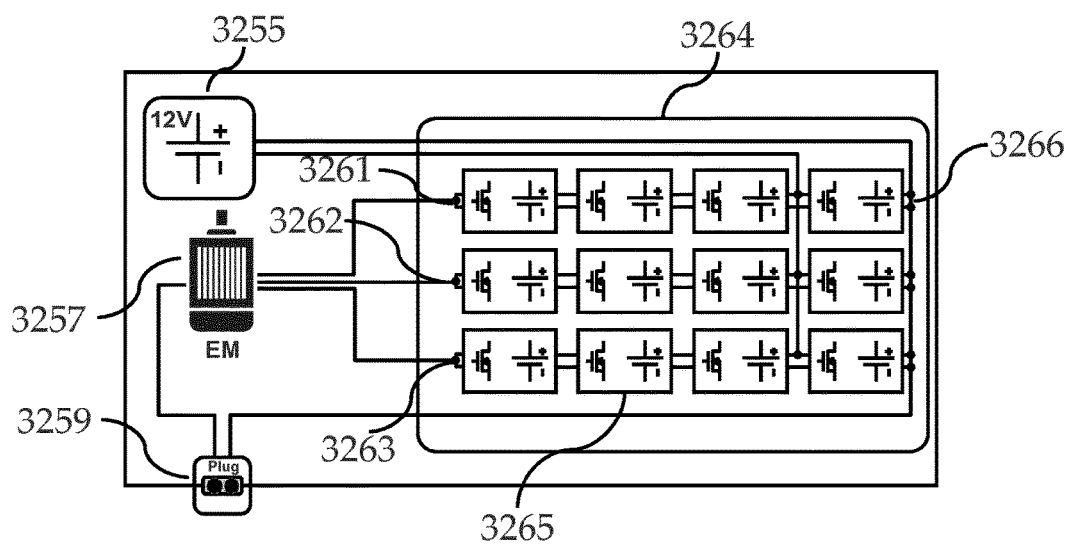
Figure 4:
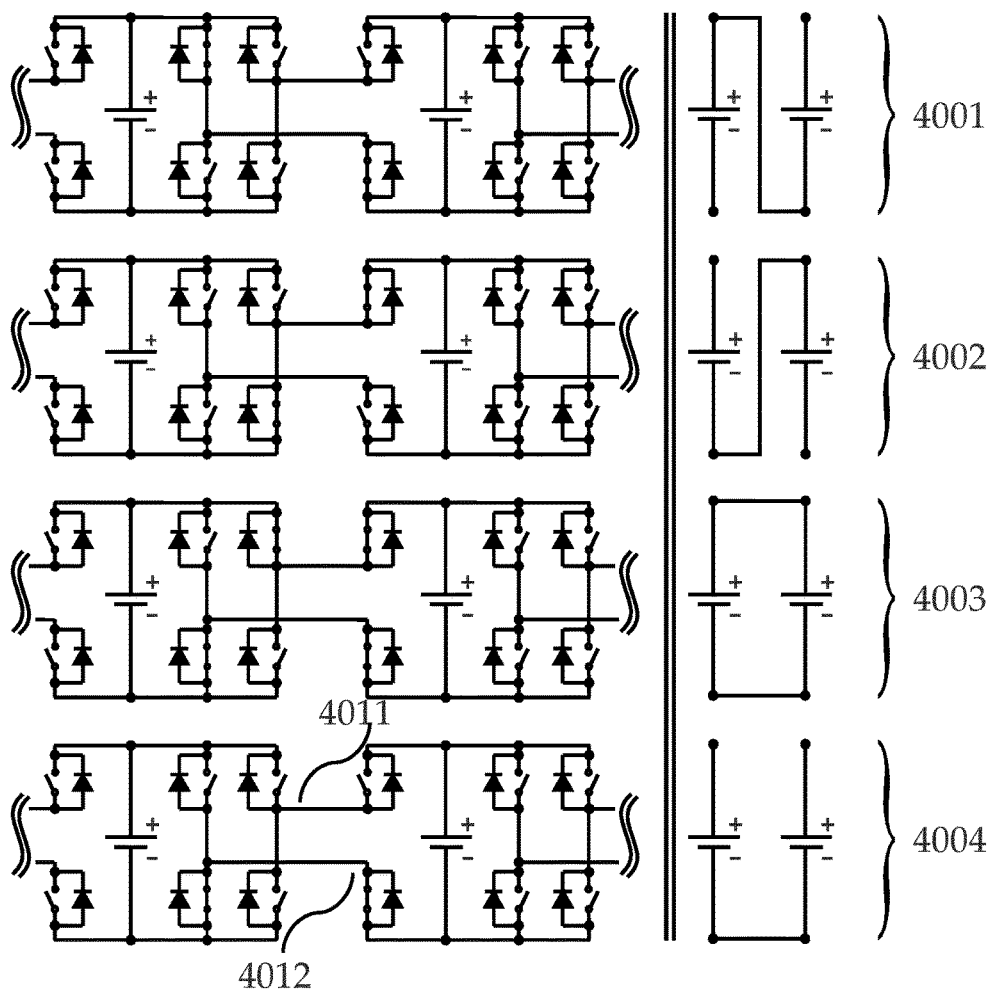

Preferably, at least one auxiliary power supply bus further comprises at least one DC battery that is electrically connected to said at least one auxiliary power supply bus A conventional battery pack can be split into an arbitrary number of battery subportions that can be incorporated into battery modules forming together a modular ac/dc battery. An individual battery subportion can contain a single battery cell only or a number of battery cells. An individual battery module comprises at least two electric switches. Electric switches can, for example, be mechanical switches, controllable resistors, electronic tubes, and semiconductor switches, such as transistors, including field-effect transistors (FET), bipolar transistors, insulated-gate bipolar transistors (IGBT), thyristors, diodes, optical switches, or the like. The battery modules can be implemented with modules using six electronic switches as shown in FIG. 4. Alternatively, other module topologies can be used, such as those shown in FIG. 1a-c or 2a-c. Modules are preferably connected in series strands as shown in FIGS. 3, 4, 5, 6, and 7.

A battery module state, also called module state, module mode, state, or mode denotes the electric connectivity between the at least one battery subportions of a battery module with the at least one battery subportion of another battery module. The battery module state is typically determined by the switching states of the individual electric switches of involved battery modules.

Preferably, modules provide at least two states: In one embodiment, among the states there is at least one state that connects the incorporated battery in series to neighbors and one state that bypasses the current so that the current does not charge or discharge the incorporated battery. In another embodiment, among the states there is at least one state that connects the incorporated battery in series to neighbors and a parallel state that allows connecting the batteries of at least two modules electrically in parallel.

At least two battery modules of the same kind or at least two battery modules of different kinds that have at least two battery module states in common as defined in more detail elsewhere in the text can be electrically connected at their battery module terminals so that each electric connection of at least one battery module terminal (1103, 1104; 1203, 1204; 1303, 1304; 2103, 2104, 2109, 2110; 2203, 2204, 2209, 2210; 2303, 2304, 2309, 2310) of one battery module with at least one battery module terminal of at least one other battery module forms an intermodule connection site (4011, 4012, 5128, 5129).

At least two said battery modules that form intermodule connection sites through at least one battery module terminal in such a way that each of said at least two battery modules is electrically connected to at least one battery module terminal of another battery module form a battery module strand (5232, 5331, 5332) or shortly strand according to the invention. If at least three battery module strands are electrically connected by electrically connecting at least one battery module terminal of each battery module strand to each other, said strands form a battery module star (7101) according to the invention; the at least one electric connection site where said at least three battery module strands are electrically connected through at least one battery module terminal of each battery module strand can form a terminal called star point (7103) in the following. In a preferred embodiment of the invention, such battery module stars comprise at least two electric battery terminals (7104, 7105, 7106), each at a different battery module terminal that is preferably not electrically connected to any other battery module terminal. At least two of said electric battery terminals may, for instance, be electrically connected to at least two terminals of at least one electric load, such as an electric machine.

With the present invention, the battery modules can themselves provide a high-power low-voltage terminal for at least one auxiliary power supply bus. One solution for appropriate integration is shown in FIG. 3b and in FIGS. 5a-6. For this solution, the auxiliary power supply is connected with one side to the star point of the strands, where all battery module strands interconnect, the other one to an interconnection between two modules of an arm. This second point can be at any other place between two modules. Preferably, only one or two modules lie between the two contacts of the low-voltage system (as shown in FIG. 3b). For a symmetric load in all strands, it is furthermore advantageous to connect the second connection of the low voltage system also to the equivalent points between two modules in at least one other strand or in all other strands. The advantage comes from the fact that this way the same amount of energy can be taken from each strand, without additional balancing. The latter is shown in FIG. 3b.

In case the modules have more than one interconnection between neighbors, the low-voltage system can be connected to one or more of these. In case it is connected to only one line, a potential parallel connectivity state of the modules could be maintained.

The electronic (drive) controller controls these terminals to the required low voltage, e.g., 12 V, 24 V, 48 V. The low-voltage condition for these terminals is accordingly an additional control equation for the electronic controller and can be controlled similarly to the machine phase voltages.

The modules that lie between the two contacts of the low-voltage system and thus control the amplitude of the low voltage system can have a lower operating voltage than the remaining modules in the arm, but they do not have to. Pulse-width modulation allows a down-conversion and accurate control in case the modules in between the terminal contacts of the low-voltage system have a higher peak voltage than the low-voltage system. A low-voltage battery can be included. Due to the high power supply from the high-voltage modular main battery, such a low-voltage battery can be reduced, in many cases omitted, or replaced by capacitors, which have lower weight.

Alternatively, the low-voltage system can be incorporated in one or several corresponding low-voltage modules (see FIGS. 6 and 10b). For this solution, the black boxes (1101, 1201, 1301, 2101, 2201, 2301) in FIGS. 1 and 2 would represent the low-voltage system, including all loads (units).

Accordingly, the low-voltage system is connected to the terminals of the electrical energy storage of the module. The drive controller controls the module voltage in these modules to the required low-voltage (e.g., 12 V, 24 V, 48 V). The module can contain a battery, a capacitor, or equivalent electrical storages. This solution allows a fast and high-power energy exchange with the remaining modules. Furthermore, several such modules can be implemented to provide independent voltage sources. In the context of the latter, safety-relevant loads could be independent from less relevant ones, such as heating, sound, or communication, to make the safety-relevant units more robust against voltage drops and other voltage stability issues caused by less relevant units, which are a major issue in current automobiles. Safety-relevant functionalities that are either provided by a number of independent units for redundancy, each of which can maintain at least a certain portion of the functionality and serve as backup unit for all others, such as brakes, or that have dedicated backup units, which can replace the main unit in case of a damage, can furthermore be supplied by different units or low-voltage systems to reduce the risk for failure in case one of the modules fails or another unit connected to the same source draws too much current and leads to a voltage dips or a shutdown.

The modules do not have to be at a certain position in the battery module strands or arms. However, being the first modules at the star point, where alls strands are connected to each other, has the advantage that the reference potential is well defined.

Preferably, a module according to the present invention is able to operate the at least one battery subunit it comprises safely and under sufficiently optimum conditions, i.e., within the specified state-of-charge range and/or the specified voltage range and/or the specified current range and/or the specified temperature range of said at least one battery subunit. Further physical and/or chemical parameter ranges may be preferred. In case the latter comprises more than one battery cell, preferably also all individual battery cells should be operated within their specified operation ranges. However, whereas battery cells of different kind that are combined in the at least one battery module may tend, for example, to discharge differently and/or provide different amounts of power and/or be confronted with different loads due to their different chemical and/or physical properties, battery cells of the same type show similar differences, e.g., due to production tolerances, different ageing, or different environmental conditions, such as temperature, at their position.

Whereas the at least two switches of a battery module, which can change the electric connectivity between battery subportions of different battery modules, easily allow balancing, among other parameters, charging as well as discharging, the individual load share, or heating of individual battery modules and/or battery subportions, they in general cannot provide such balancing on the level of parts of a battery subportion, such as a battery cell or an electric aggregate of at least two battery cells. According to the invention, unequal charging and/or discharging conditions or intentionally different charging and/or discharging conditions of individual parts of battery subportions can be controlled in preferred embodiments of the invention, which comprise at least one equalization unit.

An equalization unit according to the invention has means to transfer charge from at least one battery cell of a specific battery subportion to at least one other battery cell of said battery subportion, typically, in order to achieve a certain specified, e.g., equal within a given range or intentionally different, distribution of individual states or charge and/or of individual states of health and/or individual temperatures and/or individual voltages. If such charge transfer is performed by bypassing charging and/or discharging current around at least one battery cell, it can involve substantial energy loss because the transferred charge typically looses the energy amount equivalent to the product of the charge and the voltage of said at least one battery cell that is bypassed. Typically, embodiments using this method use electric resistors to dissipate said energy loss as heat. Alternatively, said charge transfer may involve at least one intermediate carrier, such as a magnetic field and/or an electric field, that allows the charge transfer with lower losses. Typical circuits comprise at least two electric switches dedicated to the equalization unit and at least one inductance and/or at least one capacitance.

FIGS. 8a-d and 9 show examples of equalization units and parts of equalization units according to the invention. FIG. 8a shows an example of an equalization unit that comprises at least two equalization submodules of the same kind. The at least one battery subportion comprises at least one battery cell (8106, 8107, 8108) and at least one equalization unit that comprises at least one equalization submodule (8109, 8110, 8111, 8301), which is typically connected electrically in parallel to a part of at least one battery subportion, preferably electrically in parallel to an individual battery cell. Preferably, at least one equalization submodule (8109, 8110, 8111, 8301) is electrically connected in parallel to each individual battery cell (8106, 8107, 8108) of at least one battery subportion. In FIG. 8*b*, the at least one equalization unit (8209) cannot be split into equal subunits.

Preferably, at least one equalization unit further comprises at least one electronic control unit. The at least one electronic control unit may be integrated with at least one electronic battery module control unit. Preferably, the at least one electronic control unit controls at least one electronic switch of at least one equalization unit.

FIG. 9 shows another example of a battery module according to the invention. The figure shows a battery module with here four switches (9101-9104, 9112-9115), which further allows a parallel connectivity as described above. However, the embodiment can equivalently use any other configuration of at least two electric switches (9101-9104, 9112-9115) that allows a dynamic change of the electric connectivity between battery subportions (9117) of different battery modules as defined in detail elsewhere in this description. The at least one battery subportion (9117) of a battery module can, as shown, comprise at least one battery cell (9106-9108), each of the same kind with arbitrary electric configuration of series and parallel connectivity. Alternatively, a battery subportion may comprise battery cells of different types at the same time.

Said battery module can further comprise at least one current sensor (9120). Preferably, each of such at least one current sensor detects the current flowing in and/or out of at least one battery subportion (9117) and/or a current entering the battery module through at least one electric intermodule connection.

A module according to the invention furthermore preferably comprises at least one voltage sensor (9109). Said voltage sensor can detect at least one voltage of one or more individual battery cells and/ort at least one voltage of an aggregate of at least two cells that may be electrically connected in any electrical configuration of series and/or parallel connections and/or at least one voltage of at least one battery subportion.

Preferably, a module according to the invention further comprises at least one electronic battery control unit. An electronic battery unit preferably comprises at least one integrated electronic circuit and/or at least one integrated circuit.

Furthermore, a module according to the invention further comprises at least one charge equilibration unit. In a preferred embodiment, said at least one charge equilibration unit allows selective charging and/or discharging of a part of at least one battery subportion and/or of at least one individual battery cell and/or of at least one individual aggregation of at least two battery cells. In another preferred embodiment, said at least one charge equilibration unit allows selective charging of a part of at least one battery subportion and/or of at least one individual battery cell and/or of at least one individual aggregation of at least two battery cells. With at least one such charge equilibration unit, the invention can, for example, ensure that all cells within at least one battery subportion or within any part of a battery subportion have similar state of charge and/or voltage with a given tolerance, even if at least one of said battery cells charges and/or discharges at a different rate than at least one other of said battery cells due to different charge leakage characteristics and/or different capacitance and/or different inner resistance and/or different cell technology and/or different age and/or other physical and chemical parameters. Furthermore, at least one with such charge equilibration unit, the invention can further allow the combination of different types of battery cells within at least one battery subportion, such as a combination of electrochemical secondary cells with capacitors or a combination of cells with different ratio of peak power vs. peak energy content (so-called P/E ratio). With at least one such charge equilibration unit, the invention can further intentionally enforce certain given different charging and/or discharging rates. The latter may allow, for instance, a combination of as cells with different current capabilities in the same battery subportion.

An equilibration unit can be implemented, for instance, using at least one variable resistor, such as a voltage-dependent resistor, a Zener diode (8304), transient voltage suppressor (8304), or varistor (8309), or at least one electric switch (8306, 8313, 8310, 8402, 8407), which may be combined with a resistive and/or inductive and/or mixed resistive and inductive element (8305, 8312, 8404, 8406, 8409). Advantageously, passive elements, such as variable resistors, do not require an additional electronic controller and can, for instance, ensure that the at least one voltage of an individual battery cell and/or an aggregate of battery cells and/or at least one battery subportion does not exceed a certain level, e.g., the equivalent voltage of the maximum state of charge of the corresponding battery elements. If at least one electric switch, preferably at least one semiconductor switch, is added, the current capability of the equilibration unit can be increased. The state of the at least one switch, i.e., electrically well conducting, not electrically conducting, and potentially several intermediate states with more or less limited electrical conductivity, can be set by at least one electronic battery control unit and/or a passive element, such as a variable resistor, as shown for instance in FIG. 8*d*. All examples of charge equilibration units and parts thereof as shown FIGS. 8*c* and 8*d* comprise at least two electric terminals (8302, 8303), which can be used to connect one of more specific circuits electrically in parallel to the battery cell, at least one aggregate of at least two battery cells with arbitrary series and or parallel electric configuration, or at least one battery subportion that the charge equilibration unit or part of a charge equilibration unit is supposed to act on. Equilibration unit 8401, for example, effectively uses at least one electronic switch (8402) to discharge and/or bypass current around at least one battery, e.g., at least one individual battery cell, at least one aggregate of at least two battery cells with arbitrary series and/or parallel electric configuration, or at least one battery subportion, wherein said switch can be activated, potentially among other means, by a combination of at least one electric resistor (8404) and at least one variable resistor, such as a Zener diode (8403) or transient voltage suppressor. If the voltage across the terminals of Circuit 8401 is below the break-down voltage of the at least one Zener diode (8403), the electric resistor (8404), e.g., as a pull-down resistor, keeps the gate-source voltage of the at least one electric switch (8402) below the activation threshold of the at least one electric switch (8402) so that preferably only negligible current is flowing. If the voltage between the terminals of Circuit 8401 exceeds said break-down voltage, the current flow through said at least one Zener diode (8403) can exceed the current flowing through said at least one electric resistor (8404) so that charge is accumulating at the gate-source capacitance of the at least one electric switch (8402) and loads it above the threshold voltage. For an n-type field-effect transistor, as the example shows, substantial current flow through the at least one electric switch (8402) can be initiated. Circuit 8405 shows a preferred embodiment wherein at least one electric resistor and/or at least one electric inductor and/or at least one mixed resistive-inductive element (8406) is added to the current path through the at least one electric switch (8407) so that the current through said at least one electric switch (8407) is limited and/or so that potential thermal stress is reduced for the at least one electric switch (8407).

Furthermore, a battery module may comprise at least one temperature sensor, for instance, a temperature-dependent electric resistor, e.g., containing platinum, or a PTC element, or an NTC element. The at least one temperature sensor may measure the temperature of at least one battery subportion (9117) and/or at least one temperature of at least one battery cell (9106-9108). The detected temperatures of at least one temperature sensor may be processed by at least one electronic battery module control unit.

The sensor signals from said at least one current sensor (9120) and/or said at least one voltage sensor and/or at least one temperature sensor can, for instance, be received and/or processed and/or logically combined by at least one electronic battery module control unit. Preferably, such sensor signals and/or a logical combination of several such sensor signals and/or processed information based on such sensor signals and/or decisions based on such sensor signals is furthermore electronically transmitted to at least one central electronic control unit, which can receive and/or process electronic information from more than one battery module. Furthermore, at least a part of such sensor signals and/or a logical combination of several such sensor signals and/or processed information based on such sensor signals and/or decisions based on such sensor signals is preferably electronically stored in at least one electronic memory. Said at least one electronic memory may be part of an on-board diagnosis (OBD) unit.

A battery module may further comprise at least one electric switch (9121) that preferably allows interrupting current flow into and/or out of at least one battery subportion. The state of at least one such switch can, for instance, be changed if (a) the current flowing into and/or out of at least one battery subportion exceeds a certain limit and/or if (b) the temporal rate of increase of a current flowing into and/or out of at least one battery subportion exceeds a certain limit and/or if (c) a temperature of at least one battery subportion exceeds a certain limit and/or if (c) the rate of increase of a temperature of at least one battery subportion exceeds a certain limit and/or (d) if at least one voltage of at least one battery cell and/or at least one battery subportion exceeds a certain limit and/or if the inner resistance of at least one battery cell and/or of at least one battery subportion exceeds a certain limit.

Conventional safety mechanisms use battery monitoring and thermal control systems, which are often in one or a few central electronic control units. However, the long response time of thermal monitoring is usually not sufficient to detect critical situations, such as cells catching fire, but can only prevent unfavorable conditions that could render such events more likely, e.g., operation of the battery at high temperature. In addition, a shutdown of individual cells or any battery subportions is not possible. The only response to problematic or critical situations would be a shutdown of the entire battery. Loads that store energy, such as inductive loads and particularly electric machines, however, do not allow a quick isolation of connected batteries. Especially permanent magnet machines tend to push back energy into their at least one battery if the voltage drops, and subsequently destroy further 760 equipment, such as drive inverters.

In this invention, a safety system can monitor a number of parameters. Such monitoring can, for instance, be implemented on a battery module and immediately react by shutting the battery module off, which means in this case switching the battery module to a passive mode/state or, in a preferred embodiment, isolating it by using the bypass mode/state so that all current flowing through the module is bypassed around the incorporated at least one battery portion-without shorting the battery, which is typically the only option conventional battery management systems allow for bypassing current around cells or subportions of a battery. Parameters that can be used for a decision on the cell or module level are, for instance, voltage, current, temperature, humidity, mechanic stress, pressure, cell impedance, and derived parameters such as battery state of health (soh), state of charge (soc), load history, and age.

A voltage detection that senses the output voltage of a battery subportion or parts of a subportion, preferably on a battery cell level, can detect undervoltage (i.e., a voltage lower than expected or lower than the specified healthy range of the monitored battery) and sudden voltage drops due to high unexpected currents (short circuits) or chemical reactions in the cell that may initiate a thermal runaway. An optional current sensor measuring the current influx and outflux of a battery subportion or parts of a subportion, preferably on a battery cell level, can detect high currents and short circuits, which harm the state of health of a battery and may initiate a thermal runaway. Such detection or monitoring systems can be implemented with digital electronics, e.g., at least one microcontroller, analog electronics, or a combination of digital and analog electronics.

If the detected issue, e.g., undervoltage or high current, ceases after shutting off a corresponding battery module (preferably to a passive or a bypass state) and preferably fails to return for a certain period of time, a "reconnect" can be performed after a specified time by returning to an active state, e.g., the last state it had before the issue was detected. If the issue returns one or several times, a longer or final shutdown can be performed to avoid oscillations between a shutdown and an active mode/state.

For detecting critical events in advance, the safety system of a module can preferably react if a detected value or the corresponding differentiated signal exceeds or falls below a certain threshold, if the signal follows or alternatively fails to follow a certain temporal pattern, or if several specific events occur at the same time. Examples are either one or a combination of the following events: a sudden reduction of the voltage output of a cell detected, for instance, by at least one voltage sensor followed by at least one differentiator and at least one thresholder and/or Schmitt trigger and/or thresholding switch, all of which may be implemented in digital electronics, or a mixture of digital and analog electronics, or are preferentially implemented with analog electronics for low price and high speed;

a voltage falling below a certain limit detected, for instance, by at least one voltage sensor followed by at least one thresholder and/or Schmitt trigger and/or thresholding switch;

a sudden increase of one or more temperatures detected, for instance, by at least one temperature sensor, e.g., NTC, PTC, or resistive sensor, followed by at least one differentiator and at least one thresholder and/or Schmitt trigger and/or thresholding switch;

one or more temperatures exceeding certain limits detected, for instance, by at least one temperature sensor followed by at least one thresholder and/or Schmitt trigger and/or thresholding switch; at least one suddenly increasing current detected, for instance, with at least one current sensor (e.g., a shunt resistor and/or a current clamp and/or a magnetic current sensor), at least one differentiator, and at least one thresholder and/or Schmitt trigger and/or thresholding switch;

alternatively, in case current changes are detected, at least one already differential current sensor, particularly magnetic current sensors (e.g., current clamps) can be used together with at least one thresholder and/or Schmitt trigger and/or thresholding switch;

at least one current exceeding a certain threshold (either as absolute value or with sign), e.g., detected by a current sensor together with its evaluation electronics followed by a thresholder, Schmitt trigger, or thresholding switch;

at least one battery impedance exceeding a certain threshold, e.g., detected by a combination of at least one current and voltage measurement, at least one divider, and at least one thresholder or detected by detuning of at least one oscillator or detected by the dynamic response to a short electric test pulse.

Combinations of the latter can be formed behind individual thresholders, e.g., with logic electronics such as the 74xxx, 54xxx, 84xxx, 4000, or 4500 logic families or by combining analog signals before thresholders, preferably with analog functions, such as adders, subtractors, multiplier, etc. The output signal of such detection units can either immediately actuate the module switches, usually transistors, while having higher priority than or over-write the module state on a digital side, e.g., a memory. The former can be implemented by pull-up and pull-down switches at the gates of the switches.

Preferably, sensor data and/or events that cause action of the system, such as the events listed above, are digitally transmitted to at least one digital electronic control unit (ECU) and/or stored in a digital memory. Furthermore, sensor data and/or events that cause action of the system, such as the events listed above are digitally transmitted to at least one on-board diagnostics (OBD) electronic controller.

The advantage of the invention is that such safety measures can be implemented on the cell or battery module level and do not necessarily have to involve a central controller. Furthermore, the implementation can be very simplistic without the need of microcontrollers or similar complex digital or mixed-signal electronic components. Thus, response times can be minimized for a fast action to counteract critical conditions, such as battery cells that may potentially undergo a thermal runaway, before it is unstoppable or spreads to other cells.

In addition, distributed means do not require potential isolation (e.g., with optocouplers, signal isolators, or similar elements) for communication with one or more central controllers. To further simplify monitoring and safety circuits, the sensors do not have to accurately detect one or more of the above-listed parameters, but can already on the detection side only perform a thresholding or a pattern detection to respond to certain temporal features. Thresholding can also be performed on a combination of more than one parameter, e.g., temperature and voltage. Compared to continuous monitoring with high sampling rate and high accuracy, i.e., bit rate, the invention can save expensive bandwidth on communication busses.

The power supply for these safety means can be drawn from the module energy storage, e.g., the incorporated battery cell(s). If the default state of a battery module is a bypass state, as in a preferred embodiment, there is no risk that a failure of power supply in a battery module and in consequence a not working safety means could harm safety.

The default state of a battery module denotes that state a battery module occupies when it is initialized and/or not supplied with power.

In a preferred embodiment, an existing central drive controller does not necessarily require access to the information about modules being shut off, reducing cost and complexity. If only a portion of all cells are affected by local shutdown (i.e., passive or bypassing modules), at least one central controller in that embodiment can detect the shut-off of individual battery modules, e.g., by a voltage dip of the total arm voltage at the machine or by missing influence of one module on the system voltage when actuated. This dip will usually not affect performance substantially and can quickly be compensated when the electronic controller has successfully detected it.

In addition, the electronic drive controller, which can be a central unit or a distributed system, can incorporate parameters such as state of health, temperature, current load history, current load, mechanic stress, and mechanic stress history for averaging out potential differences across cells or modules. Thus, the electronic controller can, for instance, use warm cells or battery modules less, i.e., keep them longer in the bypass or parallel state when the current is high instead of having them in the series active state, where their temperature may persist or increase.

A particular safety issue of electric drive trains, e.g., in electric vehicles, ships, trains, and airplanes, is the case of an accident or crash. Due to such a crash, the body may be broken, the drive train and other electrical components may be accessible, and high-voltage contacts could be touchable.

Furthermore, high-voltage components may touch the metal body or other metal parts that set these parts under voltage, risking both passengers as well as the rescue service, and/or shorten the battery. Since such batteries use high voltage, the short-circuit current can be large, potentially exceeding several thousand volts, cause rapid heating of the battery, and risk thermal runaway and explosions.

The present invention, in contrast, can be rapidly switched to low voltage, e.g., by switching a majority or all battery modules to a bypass state, i.e., bypassing current around the respective battery subportions, or to off, turning all electric switches of the respective battery modules off in case of a detected crash. In consequence, the highest voltage between any two metal points in the system is lower than the operation voltage during operation. If the maximum voltages of the battery subportions are low enough, the rescue service or passengers may even be able to touch contacts in the system without major risk. Furthermore, the lower voltage entails a lower short-circuit current with low risk of thermal runaway. Even though some electric switches may be broken due to an impact and become conducting, the risk that a higher number of electric switches may get damaged in such a controlled way that the broken and conducting switches turn at least two modules into a series state so that the voltage increases instead of only shorting individual cells, is negligibly small.

The invention can comprise at least one acceleration sensor, also called accelerometer, e.g., a micromechanical acceleration sensor, which monitors the acceleration acting on the invention. At least one electronic control unit may detect a crash therefore turning the invention into above-described safe state in case the acceleration exceeds a certain threshold. Alternatively, a crash may be detected if the acceleration change, i.e., the time derivative of the acceleration exceeds a certain level. Alternatively, a crash may be detected if the acceleration over time shows similarity to a predefined acceleration pattern, i.e., an impact profile, wherein the comparison may use a correlation. Instead, at least one electronic unit may detect a crash by receiving a crash message from another auxiliary unit, e.g., an airbag controller.

In addition to responding to an already ongoing and therefore detectable crash, at least one electronic control unit may switch the system to a safe state also in situation when a crash may be very likely, such as braking above a certain threshold (e.g., emergency braking).

Preferably, charging can use the converter functionality of the reconfigurable battery, i.e., the invention. However, charging may not accidentally operate the at least one electric machine, e.g., no supply it with electricity at the same time. That can be achieved in several ways:

For instance, the electrical contacts from at least one external charging connector, e.g., from an SAE, CCS, or CHAdeMO plug can be directly connected without the need of an additional charger, converter, or inverter. DC power, AC power, or any voltage profile with two electrical connections can be connected with one electric terminal being electrically connected to at least one star point of the battery module strands (see the left side of the battery module strands in FIG. 3b), with the other electrical terminal electrically connected at least one neutral point of at least one machine. In this configuration, it is assured that the machine does not rotate without the need for a switch or disconnector (although such components may be added) saving cost, space, and losses. The machine inductance can be used as a filter in that case. In the charging mode, the embodiment could operate as a charger and/or converter itself and can either charge the battery or feed energy from the battery into the grid. The charging power rating is preferably as high as the drive power rating. While most established charging systems are currently lower than 10 kW, this system could accordingly easily charge with more than 100 kW. Furthermore, the electric charging power source does not have to have very specific characteristics because the system is able to adapt to any form of electrical voltage as long as the peak voltages do not exceed certain maximum levels.

Alternatively, one charging terminal may be electrically connected to at least one star point of the battery module strands on one side whereas another charging terminal may be electrically connected to a second contact formed by shorting the n battery module terminals at the remote side of at least one, preferably all battery module strands, e.g., with at least one switch or disconnector. Alternatively, one charging terminal may be electrically connected to at least one star point formed by the battery module strands, whereas another charging terminal may be electrically connected to a second contact formed by shorting at least two, preferably all of the terminals that electrically connect to at least one electric machine. Preferably, said switches or disconnectors that do not need to be able to interrupt current flows, i.e., opening while current is flowing, considerably reducing cost.

For multiphase charging, i.e., for charging sources that provide more than two electric terminals, preferably three-phase charging, there are several options according to the invention.

In a preferred embodiment for multiphase charging, the $N_c$ individual terminals of the charging source can be electrically connected to any $N_c$ different battery module interconnection sites; preferably at least one battery module interconnection site of each battery module strand is electrically connected to at least one of said $N_c$ individual terminals of the charging source.

The battery module interconnection sites that are electrically connected to at least one of said individual terminals of the charging source are called battery module charging nodes. Preferably, the numbers of electrically interconnected battery modules that have to be passed from one battery charging node to the next are similar to each other, preferably, the numbers of electrically interconnected battery modules that have to be passed from one battery charging node to the next do not deviate by more than 25% from each other.

Another preferred embodiment comprises three battery module strands, wherein at least one module interconnection site of each of said three battery module strands is electrically connected to at least one terminal of a charging source, and wherein the electrical terminals where the battery module strands electrically connect to at least one electrical machine can be electrically connected with each other by means of at least one electrical switch and/or electrical disconnector.

In a preferred embodiment, at least one electric terminal of at least one external charging source can be electrically disconnected by means of an electric switch or disconnector. Preferably, all electric terminals of at least one external charging source can be electrically disconnected by means of an electric switch or disconnector.

A preferred embodiment comprises at least one transformer that galvanically isolates the power flow from at least one external charging source into at least one battery subportion. Preferably, there is no galvanical connection between said external charging source and any electrical contact of the modular ac/dc battery. In a particularly preferred embodiment, said at least one transformer is at least one multiphase transformer.

A preferred embodiment comprises at least one transformer that galvanically isolates the power flow from at least one external charging source into at least one battery subportion and further comprises at least one high-frequency converter that increases the frequency of the external charging source before it enters the at least one transformer. Preferably, the at least one high-frequency converter uses an AC/AC frequency converter circuit. Preferably, the at least one high-frequency converter comprises at least two electronic switches. Preferably, the at least one high-frequency converter comprises at least one half-bridge for each phase terminal of the at least one external charging source.

For charging the battery subportions incorporated into battery modules, the invention most advantageously synchronizes to the temporal voltage and/or the current profile of the external charging source. That can mean that the electronic controller operates the modules such that the voltages between those points of the invention where the external charging source is electrically connected are controlled to follow the external charging voltages, up to a predefined difference. Thus, the voltages generated by the invention may not exactly follow the charging voltages, but be, for instance, lower. The difference of the charging voltage and the voltages between those points of the invention where the external charging source is electrically connected follows the control law of the controller (e.g., constant current or constant voltage) and is usually provided by a mathematical expression. The current flowing into the modular battery is determined by that voltage difference as well as the impedances, inductances, and capacitances of batteries and other elements in the circuit. There are two particularly advantageous alternatives for control:

1) The invention and/or its at least one electronic controller detect certain parameters that describe the temporal profile of the charging source (especially the answers to the following questions: Is it AC? Is it DC? Is it multi-phase power? Is it a voltage source? Is it a current source? Which frequency does it have? What is the current phase angle? Which amplitude (voltage or current) does it have?) and then synchronize the voltages between those points of the invention where the external charging source is electrically connected to it. The required voltage in the future is predicted by a parametric model using the parameters detected initially. These parameters can be updated regularly or continuously. Such a model can, for instance, be a sine voltage $V_{peak} \sin(\omega t+\varphi)$ with the peak voltage $V_{peak}$, the angular frequency $\omega$, and the phase angle $\varphi$ as detected parameters and time t.

A preferred embodiment detects at least two parameters, which include amplitude and frequency of the voltage and/or the current of the charging source.

2) Alternatively, an electronic controller can constantly control the one or more voltages between those points of the invention where the external charging source is electrically connected to the momentary charging voltages. This approach is more general and can charge in principle from any power source with current and voltage maxima that are within specified limits, also sources with temporal current or voltage profile that has not been specified before in a parametric model for alternative 1. A user does not have to set up or program any parameters, but can simply connect the charging connector.

3) Alternatively, in a preferred embodiment of the invention, the at least one electronic control unit of the invention sends information about the required electric charging parameters, e.g., voltage, current, DC/AC, frequency, and/or phase, to at least one electronic control unit of the charging source using an electronic communication channel and/or the at least one electronic control unit of the invention receives information about the required electric charging parameters, e.g., voltage, current, DC/AC, frequency, and/or phase, from at least one electronic control unit of the charging source using an electronic communication channel.

Current-controlled charging sources can be handled equivalently, while the electronic controller of the invention preferably controls the current of its battery modules instead of the voltage.

From the perspective of individual battery subportions or battery cells, charging can be performed in any known protocol, e.g., with constant current, constant voltage, certain current- or voltage-controlled temporal profiles, and more complex objectives. Because the invention can act as a power converter with respect to the external charging source, the charging control objectives are in most cases independent from characteristics of the external charging source. A DC constant current external charging source can also be used for constant voltage charging, e.g., on a module level.

The charging objectives can be performed individually for each battery cell and/or battery subportion. In that case the electronic controller has a charge condition at least two battery modules, preferably for every battery module. Their combination will automatically lead to the overall condition providing the current or voltage interfacing the external charging source. Alternatively, the charging objectives can be on average per arm or for the entire modular battery. In that case, the charging conditions, e.g., current and/or voltage of the entire modular battery is controlled to the desired conditions, while the charging current or voltage per module is by appropriate alternation of battery module states adjusted such that the charge is distributed according to predefined levels, preferably evenly. Such alternation can be either independent and assure equal distribution statistically or by accounting the charge per module and a control law for the rotation evening out the latter.

It should be noted that the proposed system can also provide isolation, if required. Many international standards and regulations for AC charging require that the vehicle electrical system is isolated from the grid. This can be achieved by implementing at least one rectifier stage, possibly at least one power factor correction stage (which can also be provided by at least one DC/DC stage), and at least one DC/DC converter. Said at least one DC/DC converter preferably provides isolation using a high frequency transformer. The primary (grid-connected) side will preferably be formed by at least one half bridge of electric switches or at least one full bridge of electric switches. The secondary side will then preferably be formed by the proposed topology where the secondary side of the transformer is connected to one of the already discussed electric connection points for charging, as for instance shown is FIG. 3b.

A particular embodiment of the invention comprises at least two battery modules each of which can generate at least two equivalent switching states, i.e., states of how battery subportions of different modules are electrically interconnected, and each of which comprises at least one electrical energy storage element, wherein each of the at least two modules comprises at least one electrical switch that allows to change the connectivity of the at least one electrical energy storage element of one module and the at least one electrical energy storage element of another module, while said connectivity is determined by the switching state.

Preferably, the at least two equivalent switching states that the at least two battery modules of the afore-described embodiment can generate are among the following:

the at least one electrical energy storage element of one module is electrically conductively connected in series with the at least one electrical element able to release and/or absorb electrical energy of another module by appropriate switching of the at least one switch of each of these two modules;

the at least one electrical energy storage element of one module is electrically conductively connected in parallel with the at least one electrical element able to release and/or absorb electrical energy of another module by appropriate switching of the at least one switch of each of these two modules;

the at least one electrical energy storage element of one battery module is bypassed by appropriate switching of the at least one switch of this battery module, which means that not more than one of the at least two noncongruent electrical contacts of the at least one electrical element able to release and/or absorb electrical energy of said module is electrically conductively connected to the at least one electrical energy storage element of another module.

In a preferred embodiment of the invention, said at least one electrical energy storage in each of said at least two battery modules of the afore-mentioned embodiments is an electrochemical energy storage cell with an energy content of at least 3 Wh.

In another preferred embodiment of the invention, at least one of the said electrical energy storages is a double-layer capacitor, in which energy is stored in Helmholtz charge double layers.

In another embodiment of the invention, at least two energy storages use different storage types such that they differ in at least two of the following characteristics by at least 50%:

energy capacity;
energy capacity per mass density;
peak power per mass density;
durability;
operating voltage range;
maximum specified current rise time;
specified peak current;
cost.

Another embodiment of the invention comprises at least one electric machine. Preferably, said at least one electric machine is an electric motor.

In a preferred embodiment of the invention, said at least one electric motor of one of the afore-described embodiments is an alternating current machine.

In another preferred embodiment of the invention, said at least one electric motor of one of the afore-described embodiments is a three-phase machine.

In another preferred embodiment of the invention, said electric motor of one of the afore-described embodiments has an operation voltage of at least four times the module voltage formed by the electrical energy storage elements of the respective module with the highest module voltage.

Another preferred embodiment of the invention further comprises at least one electrical terminal to connect to at least one auxiliary power supply bus.

In another preferred embodiment of the invention, said at least one auxiliary power supply bus of one of the afore-described embodiments uses a voltage that is a multiple of 12 V.

In another preferred embodiment of the invention, at least one of the at least one low-voltage direct-current systems contains a separate electrical energy storage which is operated at the voltage of said low-voltage direct-current system.

In another preferred embodiment of the invention, at least one electrical terminal to connect to at least one auxiliary power supply bus is formed by at least one pair of nodes while every pair of nodes is formed by at least two non-identical electrical connections between modules.

In another preferred embodiment of the invention, the voltage of at least one auxiliary power supply bus is lower than the maximum voltage of the battery modules that are electrically connected between the pair of nodes forming the at least one electrical terminal to connect to at least one auxiliary power supply bus.

In another preferred embodiment of the invention, said at least one electrical terminal to connect to at least one auxiliary power supply bus is formed by the electrical nodes of the at least one electrical energy storage of a battery module.

Another embodiment of the invention comprises at least two auxiliary power supply busses.

In a preferred embodiment of the invention, the at least two auxiliary power supply busses differ in voltage.

In another preferred embodiment of the invention, the at least one of said at least two auxiliary power supply busses of one of the above-described embodiments provides electric power for safety-relevant units only.

In another preferred embodiment of the invention, units and their backup units are supplied by different auxiliary power supply busses.

In another embodiment of the invention, at least two battery modules of one of the above-described embodiments further comprise a voltage equilibration unit.

In another preferred embodiment of the invention, said at least one voltage equilibration unit contains at least one voltage sensor.

Another preferred embodiment of the invention comprises at least one voltage sensor that detects the module voltage provided by at least one electrical energy storage element.

In another preferred embodiment of the invention, said protection unit further contains at least one electric switch that is electrically connected in series to at least one electrical energy storage element of the corresponding battery module.

In another preferred embodiment of the invention, said at least one voltage equilibration unit further comprises at least one threshold detection element.

In another preferred embodiment of the invention, said at least one voltage equilibration unit further comprises at least one differentiator.

In another preferred embodiment of the invention, said at least one voltage equilibration unit comprises at least one current sensor.

In another preferred embodiment of the invention, at least one of said at least one current sensor detects the current flowing through at least one of the electric energy storage elements of the respective battery modules.

In another embodiment of the invention, each of said at least two battery modules are electrically interconnected in series to form at least one battery module strand.

In another preferred embodiment of the invention, each of said at least two battery modules are electrically interconnected in series to form at least three battery module strands, all of which are connected on one end to form a star.

In another preferred embodiment of the invention, the end of each battery module strand that is not connected to the star point is connected to a winding of at least one electrical machine.

In another embodiment of the invention, at least one electrical contact of at least one charging connector is electrically connected to at least one star point, in which said at least three module strands are electrically connected to each other, and at least one other electrical contact of said at least one charging connector is electrically connected to at least one neutral point of the windings of said at least one electrical machine.

In another preferred embodiment of the invention, at least one connection of said at least one charging connector can be at least temporarily galvanically isolated by at least one electrical switch.

In another preferred embodiment of the invention, each end of a battery module strand is electrically connected to a least one electrical contact of at least one charging connector in such a way that not both ends of the same battery module strand are electrically connected to the same electrical contact of a charging connector.

In another preferred embodiment of the invention, all electrical connections in which more than one end of at least two different converter strands are electrically connected to the same electrical contact of a charging connector can at least temporarily be galvanically isolated by at least one electrical switch.

In another preferred embodiment of the invention, at least one electrical connection between at least one electrical contact of at least one charging connector and the circuit can be interrupted by at least one electrical switch.

In a preferred embodiment of the invention, at least one pair of electrical connections between at least two different electrical contacts of at least one charging connector and the battery subportions of the invention is galvanically isolated.

In a preferred embodiment of the invention, at least one pair of electrical connections between at least two different electrical contacts of at least one charging connector and the battery subportions of the invention is galvanically isolated by at least one transformer.

In another preferred embodiment of the invention, the electrical connection of the at least one charging connector and said at least one transformer is provided by at least one electronic inverter.

Another embodiment of the invention comprises a power-factor corrector unit that is electrically connected to at least one charging connector.

Another embodiment of the invention refers to a method for generating at least one electrical voltage for at least one electrical load by dynamically reconfiguring the connectivity of battery modules, each of which incorporates at least one battery subportion so that one of said battery modules comprises at least a first battery subportion and another of said battery modules comprises at least a second battery subportion, subsequently between at least two of the following switching states:

the first battery subportion is electrically conductively connected in series to at least to the second battery subportion;

the first battery subportion is electrically conductively connected in parallel to at least to the second battery subportion;

the first battery subportion is not electrically conductively connected to any other battery subportion so that no charge is exchanged between the first battery subportion and another battery subportion.

In a preferred embodiment, said method generates at least one alternating-current waveform by dynamically reconfiguring the connectivity of battery subportions over time.

In another preferred embodiment of the invention, said method dynamically reconfigures the connectivity of battery subportions by changing the state of at least two electric switches to effectively generate at least three alternating-current (ac) waveforms with an amplitude of at least 100 volts (V) to rotate an electrical machine and to concurrently generate at least one direct-current (dc) voltage with less than 100 volts (V).

Another embodiment of the invention comprises at least one acceleration sensor. Preferably, at least one electronic control unit monitoring the at least one acceleration sensor detects a crashes based on the signal of the at least one acceleration sensor and turns the invention into a safe state. Preferably, the latter is a state wherein the maximum voltage between any two module interconnections or accessible metal contacts does not exceed the largest voltage of a battery subportion. Preferably, the battery modules are either in a parallel or in a bypass state. In a preferred embodiment of the invention, the maximum voltage of a battery subportion is no higher than 60 V and therefore considered low risk.

Whereas above the invention is described with reference to specific characteristic embodiments, modifications and variations of the invention may be constructed without departing from the scope of the invention, which is defined as follows.

The invention claimed is:

1. An electrical circuit comprising:
at least three battery modules, wherein;
each of said battery modules comprises at least one battery subportion and at least two electric switches,
each of said battery modules is electrically connected to at least a second of said battery modules through at least one electric inter-battery-module connection line, and said at least two electric switches in each battery module are configured to change an electric connectivity between a first battery subportion of one of said battery modules and at least one second battery subportion of another of said battery modules between at least two alternatives of the electric connectivity by effective switching of said electric switches; and at least one auxiliary power supply bus, wherein the at least one auxiliary power supply bus comprises at least two electric terminals that are pairwise electrically connected to at least two noncongruent electrical contacts of at least one battery subportion of at least one battery module.

2. The electrical circuit of claim 1, wherein said at least two alternatives of the electric connectivity include at least two of the following:

the at least one battery subportion of one battery module is electrically conductively connected in series with the at least one battery subportion of another battery module;

the at least one battery subportion of one battery module is electrically conductively connected in parallel with the at least one battery subportion of another battery module; and the at least one battery subportion of one battery module is bypassed so that not more than one of the at least two noncongruent electrical contacts of the at least one battery subportion of said battery module is electrically conductively connected to the at least one battery subportion of another module.

3. The electrical circuit of claim 1, wherein said at least two alternatives of the electric connectivity comprise at least the following:

the at least one battery subportion of one battery module is electrically conductively connected in series with the at least one battery subportion of another battery module; and the at least one battery subportion of one battery module is bypassed so that not more than one of the at least two noncongruent electrical contacts of the at least one battery subportion of said battery module is electrically conductively connected to the at least one battery subportion of another module.

4. The electrical circuit of claim 3, wherein said at least two alternatives of the electric connectivity further comprise the following:

the at least one battery subportion of one battery module is electrically conductively connected in parallel with the at least one battery subportion of another battery module.

5. The electrical circuit of claim 1, wherein the at least one battery subportion of one battery module is configured to be electrically conductively connected in series with the at least one battery subportion of another battery module with positive electrical polarity and with negative electrical polarity.

6. The electrical circuit of claim 1, wherein said at least one battery subportion in each of said at least three battery modules is an electrochemical energy storage cell with an energy content of at least 3 Wh.

7. The electrical circuit of claim 1, wherein at least one of the said electrical energy storages is a double-layer capacitor, in which energy is stored in Helmholtz charge double layers.

8. The electrical circuit of claim 1, wherein at least two battery subportions comprise different storage types such that they differ in at least two of the following characteristics by at least 50%:
energy capacity;
energy capacity per mass density;
peak power per mass density;
durability;
operating voltage range;
maximum specified current rise time;
specified peak current; and
cost.

9. The electrical circuit of claim 1, further comprising at least one electric machine.

10. The electrical circuit of claim 9, wherein said at least one electric machine is an alternating current machine with at least three electric phases.

11. The electrical circuit of claim 9, wherein said electric machine is operated at a voltage of at least four times a module voltage formed by the electrical energy storage elements of the respective module with the highest module voltage.

12. The electrical circuit of claim 1, wherein the at least one auxiliary power supply bus uses a rated voltage that does not deviate from a multiple of 12 V by more than 25%.

13. The electrical circuit of claim 1, wherein the at least one auxiliary power supply bus comprises at least one separate electrical energy storage which is operated at the voltage of the at least one auxiliary power supply bus.

14. The electrical circuit of claim 1, wherein the at least one auxiliary power supply bus further comprises at least two terminals each of which is electrically connected to at least one of said electric inter-battery-module connection lines.

15. The electrical circuit of claim 1, wherein a temporal average voltage of the at least one auxiliary power supply bus is lower than a maximum voltage the battery modules can generate between the at least two electric inter-module connection sites to which the at least two terminals of the at least one auxiliary power supply bus are electrically connected.

16. The electrical circuit of claim 15, wherein the temporal average voltage of at least one auxiliary power supply bus is lower than a third of the sum of the battery subportions of the battery modules.

17. An electrical circuit comprising:
at least three battery modules, wherein:
each of said battery modules comprises at least one battery subportion and at least two electric switches,
each of said battery modules is electrically connected to at least a second of said battery modules through at least one electric inter-battery-module connection line, and
said at least two electric switches in each battery module are configured to change an electric connectivity between a first battery subportion of one of said battery modules and at least one second battery subportion of another of said battery modules between at least two alternatives of the electric connectivity by effective switching of said electric switches; and
at least one auxiliary power supply bus, wherein:
at least one auxiliary power supply bus further comprises at least two terminals each of which is electrically connected to at least one of said electric inter-battery-module connection lines, and
the at least one auxiliary power supply bus is configured to be temporarily disconnected from at least one of its terminals by at least one electric switch.

18. The electrical circuit of claim 1, wherein the at least one auxiliary power supply bus further comprises at least one transformer.

19. The electrical circuit of claim 18, wherein the electrical circuit comprises at least one rectifier.

20. The electrical circuit of claim 1, further comprising at least two auxiliary power supply busses.

21. The electrical circuit of claim 20, wherein the at least two auxiliary power supply busses differ in voltage by at least 25%.

22. An electrical circuit comprising:
at least three battery modules, wherein:
each of said battery modules comprises at least one battery subportion and at least two electric switches,
each of said battery modules is electrically connected to at least a second of said battery modules through at least one electric inter-battery-module connection line, and
said at least two electric switches in each battery module are configured to change an electric connectivity between a first battery subportion of one of said battery modules and at least one second battery subportion of another of said battery modules between at least two alternatives of the electric connectivity by effective switching of said electric switches; and
at least two auxiliary power supply busses, wherein:
the at least two auxiliary power supply busses differ in voltage by at least 25%, and
at least one auxiliary power supply bus provides electric power for safety-relevant auxiliaries.

23. An electrical circuit comprising:
at least three battery modules, wherein:
each of said battery modules comprises at least one battery subportion and at least two electric switches,
each of said battery modules is electrically connected to at least a second of said battery modules through at least one electric inter-battery-module connection line, and
said at least two electric switches in each battery module are configured to change an electric connectivity between a first battery subportion of one of said battery modules and at least one second battery subportion of another of said battery modules between at least two alternatives of the electric connectivity by effective switching of said electric switches;
at least two auxiliary power supply busses; and
at least two auxiliary units configured to provide at least one same functionality electrically connected to different auxiliary power supply busses.

24. An electrical circuit comprising:
at least three battery modules, wherein:
each of said battery modules comprises at least one battery subportion and at least two electric switches,
each of said battery modules is electrically connected to at least a second of said battery modules through at least one electric inter-battery-module connection line, and
said at least two electric switches in each battery module are configured to change an electric connectivity between a first battery subportion of one of said battery modules and at least one second battery subportion of another of said battery modules between at least two alternatives of the electric connectivity by effective switching of said electric switches; and at least two auxiliary power supply busses, wherein a functionality with specified safety level of at least ASIL C is provided by at least two auxiliaries that are electrically connected to different auxiliary power supply busses.

25. The electrical circuit of claim 1, wherein at least two modules further comprise at least one charge equilibration unit.

26. The electrical circuit of claim 25, wherein said at least one charge equilibration unit comprises at least one electric switch that is configured to be activated such that the charge level of a first part of a battery subportion is changed to a different extent than the charge level of a second part of the battery subportion.

27. The electrical circuit of claim 25, wherein said at least one charge equilibration unit comprises at least one voltage sensor.

28. The electrical circuit of claim 25, wherein said charge equilibration unit further comprises at least one electric switch that is connected electrically in series to at least one electrical energy storage element of the corresponding module.

29. The electrical circuit of claim 25, wherein said at least one charge equilibration unit further comprises at least one current sensor.

30. The electrical circuit of claim 1, wherein each of at least two battery modules further comprises at least one voltage sensor that monitors the voltage of at least one battery subportion of each respective battery subportion.

31. The electrical circuit of claim 1, wherein each of at least two battery modules further comprises at least two voltage sensors each of which detects the voltage of a different subsection of the same battery subportion, wherein said at least two different subsections are electrically connected in series to each other.

32. The electrical circuit of claim 1, wherein each of at least two battery modules further comprises at least one temperature sensor.

33. An electrical circuit comprising:
at least three battery modules, wherein:
each of said battery modules comprises at least one battery subportion and at least two electric switches,
each of said battery modules is electrically connected to at least a second of said battery modules through at least one electric inter-battery-module connection line, and
said at least two electric switches in each battery module are configured to change an electric connectivity between a first battery subportion of one of said battery modules and at least one second battery subportion of another of said battery modules between at least two alternatives of the electric connectivity by effective switching of said electric switches; and
at least one acceleration sensor.

34. The electrical circuit of claim 1, wherein each of at least two battery modules further comprises at least one current sensor that detects the current flowing through at least one battery subportion.

35. The electrical circuit of claim 1, comprising at least one electronic controller that controls said at least two electric switches.

36. The electrical circuit of claim 1, wherein each of at least two battery modules comprises at least one electronic controller that effectively controls said at least two electric switches.

37. A method for generating at least one electrical voltage for at least one electrical load comprising:
regularly reconfiguring an electrical connectivity of at least two battery subportions by subsequently changing between at least the following switching states using at least two electric switches per battery subportion:
a first battery subportion is electrically conductively connected in series to at least one second battery subportion, and
the at least one battery subportion is not electrically conductively connected to any other battery subportion,
wherein each of the at least two battery subportions comprises at least one electronic controller which turns a battery subportion off by changing a connectivity of the battery subportion to the other battery subportion in such a way that the battery subportion is not forming a closed electric circuit with at least one other battery subportion or at least one load so that said battery subportion is not involved in external current flow, if an emergency event is detected by said at least one electronic controller.

38. The method of claim 37, wherein the method generates said at least one electrical voltage by subsequently changing between at least the following switching states using at least two electric switches per battery subportion:
a first battery subportion is electrically conductively connected in series to at least one second battery subportion;
the at least one first battery subportion is electrically conductively connected in parallel to at least one second battery subportion; and
the at least one battery subportion is not electrically conductively connected to any other battery subportion.

39. The method of claim 37, wherein at least one of said at least one electrical voltage is changing over time.

40. The method of claim 37, wherein at least one of said at least one electrical voltage contains sinusoidal segments.

41. The method of claim 37, further comprising generating at least three electrical voltages containing sinusoidal segments forming a three-phase system.

42. The method of claim 37, wherein the at least one electrical load is an electrical machine.

43. The method of claim 37, wherein the at least one electrical load is an auxiliary power supply bus.

44. The method of claim 37, wherein said emergency event is detected by said at least one electronic controller if at least one current sensor detecting the current flowing into at least one battery subportion and connected to said at least one electronic controller exceeds a predefined threshold.

45. The method of claim 37, wherein said emergency event is detected by said at least one electronic controller if at least one voltage sensor detecting the voltage of at least one battery subportion and connected to said at least one electronic controller exceeds or falls below a predefined threshold.

46. The method of claim 37, wherein said emergency event is detected by said at least one electronic controller if a binary logic combination of at least one of the following conditions is true:
(a) the voltage of at least one electrical energy storage element is lower than a predefined first level;

(b) the voltage of at least one electrical energy storage element is higher than a predefined second level;
(c) the current flowing through at least one electrical energy storage element is higher than a predefined third level;
(d) a time derivative of the voltage of at least one electrical energy storage element is higher than a predefined fourth level;
(e) a temperature of at least one electrical energy storage element is higher than a predefined fifth level;
(g) an acceleration detected by at least one acceleration sensor is higher than a predefined sixth level.

47. The method of claim 37, wherein an electric charging current or electric charging voltage provided by at least one external electric charging source is controlled by reconfiguring the electrical connectivity of at least two battery subportions to charge the at least two battery subportions.

48. The method of claim 47, wherein the at least one external electric charging source is connected before charging begins by closing at least one electrical switch and disconnected after charging ends by opening said at least one electrical switch.

* * * * *